(12) United States Patent
Suzuki et al.

(10) Patent No.: US 8,085,691 B2
(45) Date of Patent: Dec. 27, 2011

(54) WIRELESS COMMUNICATION SYSTEM, WIRELESS COMMUNICATION CONTROL APPARATUS AND WIRELESS COMMUNICATION CONTROL METHOD, AND COMPUTER PROGRAM

(75) Inventors: Mitsuhiro Suzuki, Chiba (JP); Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/731,639

(22) Filed: Mar. 25, 2010

(65) Prior Publication Data

US 2010/0202296 A1 Aug. 12, 2010

Related U.S. Application Data

(62) Division of application No. 10/332,304, filed as application No. PCT/JP02/04376 on May 1, 2002, now Pat. No. 7,729,293.

(30) Foreign Application Priority Data

| May 8, 2001 | (JP) | P2001-177783 |
| Aug. 23, 2001 | (JP) | P2001-253701 |
| Apr. 17, 2002 | (JP) | P2002-115063 |

(51) Int. Cl.
  *H04L 12/28* (2006.01)
(52) U.S. Cl. ......... 370/255; 370/310; 370/328; 370/389
(58) Field of Classification Search ................. 370/321, 370/315, 337, 345, 347, 438, 442, 336, 329
See application file for complete search history.

(56) References Cited

U.S. PATENT DOCUMENTS

| 5,487,065 A | 1/1996 | Acampora et al. |
| 5,504,746 A | 4/1996 | Meier |
| 5,633,873 A | 5/1997 | Kay et al. |
| 5,638,371 A | 6/1997 | Raychaudhuri et al. |
| 5,852,405 A | 12/1998 | Yoneda et al. |
| 5,926,501 A | 7/1999 | Souissi et al. |
| 5,987,032 A | 11/1999 | Nadgauda et al. |
| 6,542,481 B2 | 4/2003 | Foore et al. |

(Continued)

FOREIGN PATENT DOCUMENTS

EP 0720405 7/1996

(Continued)

OTHER PUBLICATIONS

"What is Bluetooth?" NTT data ubiquitous study group, First edition 3rd print, pp. 96-106, CUTT System Development Laboratory, Dec. 10, 2000.

*Primary Examiner* — Ayaz Sheikh
*Assistant Examiner* — Mounir Moutaouakil
(74) *Attorney, Agent, or Firm* — Lerner, David, Littenberg, Krumholz & Mentlik, LLP

(57) ABSTRACT

A communication terminal under the control of a wireless base station recursively has wireless base station capabilities in a parent network, constructs a daughter network within a scope of resources of the own apparatus assigned by the wireless base station, and assigns the resources to an other communication terminal under the control of the communication terminal having base station capabilities. This novel constitution allows to configure two or more networks guaranteed not to interfere each other, thereby allowing the coexistence of a plurality of personal area networks on a same frequency channel. At the same time, the novel constitution allows expanding a network area without increasing the scale of equipment.

20 Claims, 15 Drawing Sheets

U.S. PATENT DOCUMENTS

| | | |
|---|---|---|
| 6,574,452 B1 | 6/2003 | Morvan et al. |
| 7,110,380 B2 * | 9/2006 | Shvodian ............... 370/336 |
| 7,190,686 B1 * | 3/2007 | Beals .................. 370/337 |
| 7,433,334 B2 | 10/2008 | Marjelund et al. |
| 2002/0173272 A1 * | 11/2002 | Liang et al. ............. 455/63 |
| 2003/0186713 A1 * | 10/2003 | Sugaya et al. ........... 455/501 |
| 2003/0193908 A1 | 10/2003 | Cain |
| 2004/0131033 A1 | 7/2004 | Dick et al. |
| 2004/0208136 A1 | 10/2004 | Dick et al. |

FOREIGN PATENT DOCUMENTS

| | | |
|---|---|---|
| EP | 1089499 | 4/2001 |
| EP | 1333613 | 8/2003 |
| GB | 2286505 | 8/1995 |
| JP | 08-256153 A | 10/1996 |
| JP | 2005-245039 A | 9/2005 |
| JP | 2005-245040 A | 9/2005 |
| WO | 00/48367 | 8/2000 |
| WO | 01/28170 | 4/2001 |

* cited by examiner

F I G. 1
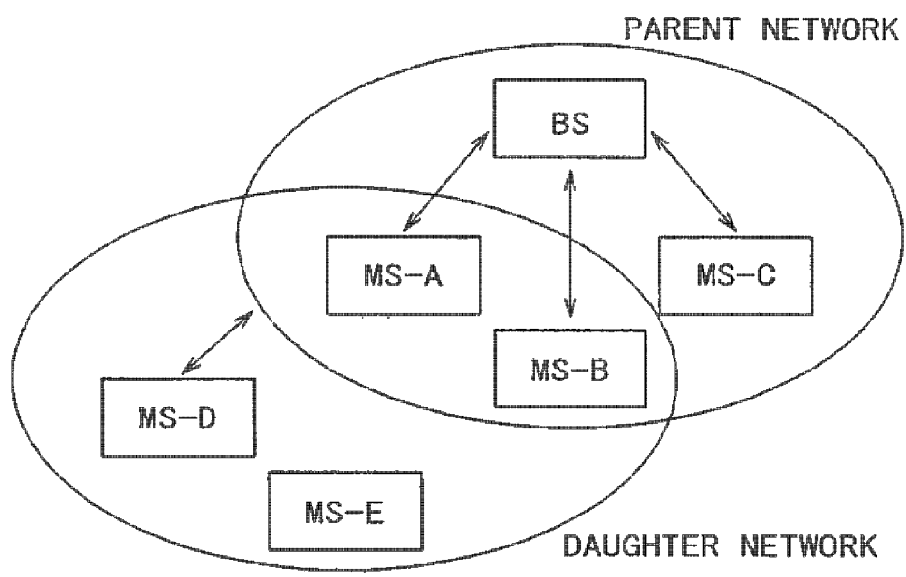
F I G. 2
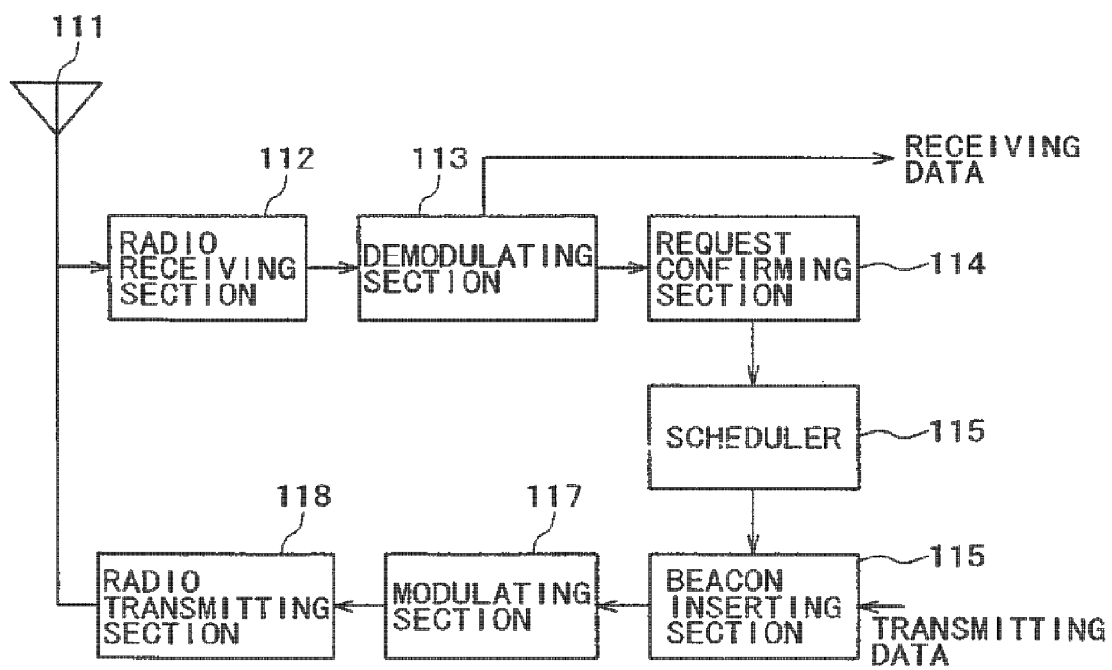

FIRST PICONET 1          SECOND PICONET 2

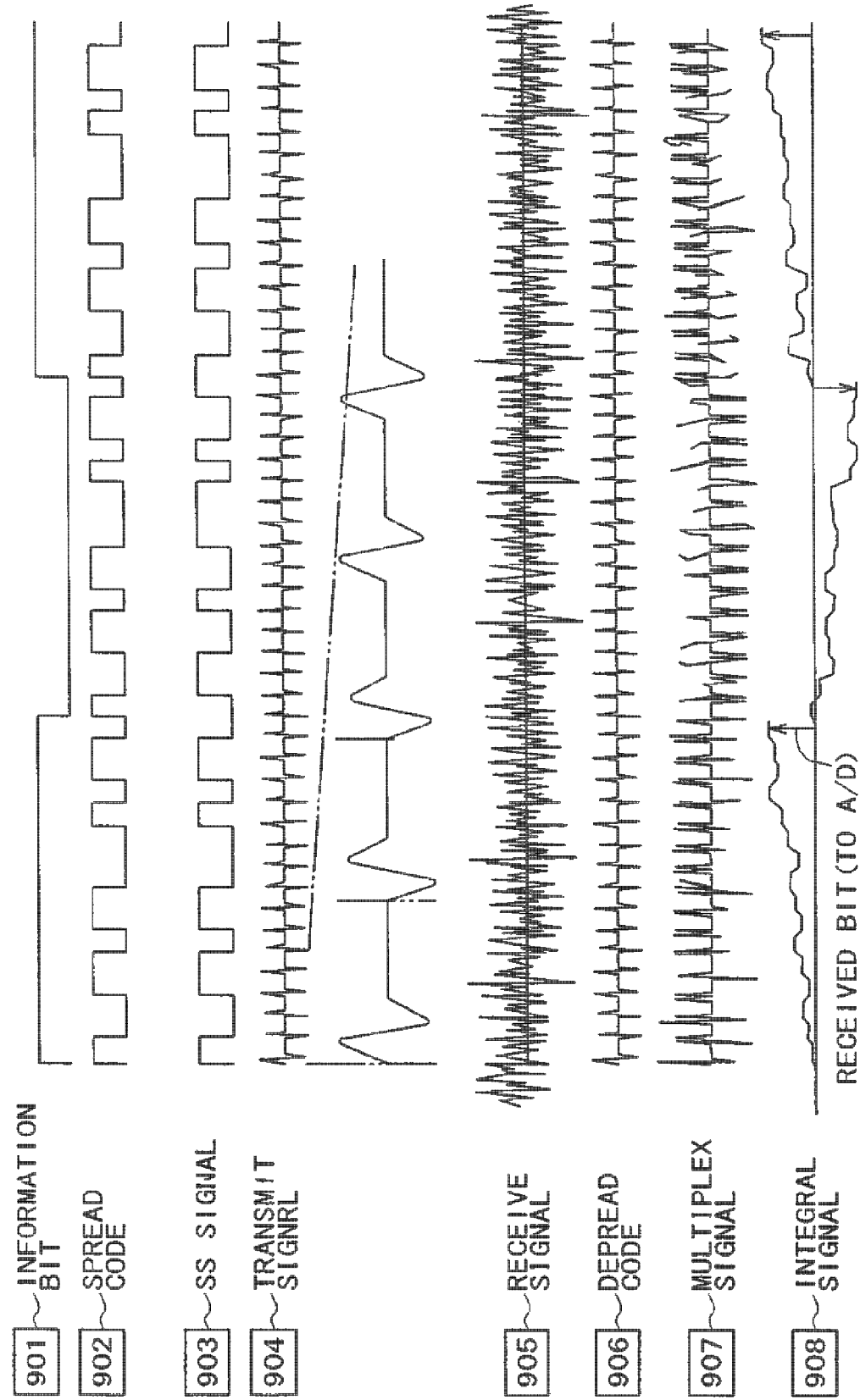

WIRELESS COMMUNICATION SYSTEM, WIRELESS COMMUNICATION CONTROL APPARATUS AND WIRELESS COMMUNICATION CONTROL METHOD, AND COMPUTER PROGRAM

CROSS-REFERENCE TO RELATED APPLICATIONS

This application is a divisional of U.S. application Ser. No. 10/332,304, filed on May 5, 2003, now U.S. Pat. No. 7,729, 293, which is a national stage application under 35 U.S.C. §371 of International Application No. PCT/JP02/04376, filed May 1, 2002, which claims priority from Japanese Application Nos. 2001-177783, filed May 8, 2001, 2001-253701, filed Aug. 23, 2001, and 2002-115063, filed Apr. 17, 2002, the disclosures of which are hereby incorporated by reference herein.

BACKGROUND OF THE INVENTION

1. Technical Field

The present invention relates generally to a wireless communication system, a wireless communication control apparatus and a wireless communication control method, and a computer program which realize mutual communication between a plurality of wireless stations and, more particularly, to a wireless communication system, a wireless communication control apparatus and a wireless communication control method, and a computer program which realize the construction of a network under the control of a particular control station.

To be more specific, the present invention relates generally to a wireless communication system in which a plurality of wireless networks exist at the same time, a wireless communication control apparatus and a wireless communication control method for controlling the communication operation in each of a plurality of contending wireless networks, and a computer program. Still more specific, the present invention relates to a wireless communication system in which a plurality of wireless networks contending with each other at a same frequency band exist at the same time, a wireless communication control apparatus and a wireless communication control method for controlling the communication operation in each of a plurality of wireless networks contending with each other at a same frequency band, and a computer program. (It should be noted that the "same frequency band" referred to herein includes UWB (Ultra Wide Band) wireless communications technology by which data are transferred as spread over ultra wide band.)

2. Background Art

Configuring a LAN (Local Area Network) by interconnecting a plurality of computers allows the sharing of information such as files and data, the sharing of peripheral devices such as printers, and the exchanging of information such as electronic mail and content data.

Conventionally, it is a general practice to perform LAN connections in a wired manner based on optical fibers, coaxial cables, or twisted-pair cables. This requires line laying work, making it difficult to construct networks with ease and making cable wiring complicated. After the construction of a LAN, the moving range of apparatuses is limited by the cable lengths, thereby making it inconvenient to use the constructed system. To free the users from the conventional wired LAN systems, wireless LANs have been attracting attention of those who are concerned. According to wireless LANs, most of the cables laid in offices and other work spaces can be left out, thereby making it comparatively easy to move communication terminals personal computers (PCs).

Recently, because of their enhanced transmission speeds and reduced costs, wireless LAN systems have been increasingly in high demand. Especially, it is a recent trend that the communication of information is performed by constructing small-scale wireless networks among plural personal electronic devices, so that researches are being made into the introduction of a personal area network (PAN). For example, PAN specifies different wireless combination systems based on 2.4 GHz and 5 GHz bands, which do not require the license from authorities concerned.

For example, the IEEE 802.15.3 standardizes personal area networks having transfer rates higher than 20 Mbps. This IEEE section is mainly promoting the standardization based on the PHY layer mainly using signals of 2.4 GHz band.

In these wireless personal networks, one wireless communication apparatus operates as a control station called a "coordinator" around which a personal area network is constructed within a range of about 10 meters. The coordinator transmits a beacon signal at a predetermined period and this beacon period is specified as a transmission frame period. At every transmission frame period, the time slots to be used by the wireless communication apparatuses of the wireless personal network are assigned.

For the time slot assigning, methods called "guaranteed time slot (GTS)" and "dynamic TDMA (Time Division Multiple Access)" for example are used in which a communication method is assumed for dynamically assigning transmission time slots while guaranteeing a predetermined transmission capacity.

For example, the MAC layer standardized by the IEEE 802.15.3 prepares the contention access period (CAP) and the contention free period (CFP). For asynchronous communication, the contention access period is used to exchange short data and command information. For stream communication, dynamic time slot assignment is performed by the guaranteed time slot (GTS) in the contention free period, thereby performing guaranteed time slot transmission.

The MAC layer portion standardized by the IEEE 802.15.3 is specified so that it is applicable as the standard specifications of the PHY layer in addition to the PHY layer based on 2.4 GHz band signal. Also, the standardizing activities have begun for the application of the PHY layer standardized by the IEEE 802.1.5.3 to other PHY layers than the PHY layer based on 2.4 GHz band signal.

Recently, wireless LAN (Local Area Network) systems based on SS (Spread Spectrum) technologies have been put into practical use. Also recently proposed is the UWB (Ultra Wide Band) transmission scheme based on the SS intended for applications such as PAN.

The DS (Direct Spread) scheme, which is one of SS schemes, multiplies an information signal by a random code sequence called PN (Pseudo Noise) to spread the occupied band and transmits the resultant signal on the transmitting side; on the receiving side, the received spread information signal is multiplied by the PN code for de-spread to reproduce the information signal. In the UWB scheme, this information signal spread rate is maximized by which a high-speed data transmission is realized by performing to transmit/receive data such that the data is spread over an ultra high frequency band of 2 GHz to 6 GHz for example.

In the UWB scheme, an information signal is configured by use of impulse signal trains each having a period of as short as several 100 picoseconds and this signal train is transferred. Its occupied band width is in GHz order so that the value obtained by dividing the occupied band width by its center frequency (for example, 1 GHz to 10 GHz) becomes about 1, which is a ultra wide band as compared with the band widths commonly used in wireless LANs based on so-called W-CDMA, cdma 2000, SS (Spread Spectrum), and OFDM (Orthogonal Frequency Division Multiplexing) schemes.

Referring to FIG. 20, there is shown an example of the data transmission based on the UWB scheme. Input information 901 is spread by a spread sequence 902. In some systems based on UWB, the multiplication of this spread sequence is left out.

An information signal 903 resulted from the spectrum spread is demodulated by use of the impulse signal (wavelet pulse) of the UWB scheme (905). This modulation is based on PPM (Pulse Position Modulation), biphase modulation, or amplitude modulation for example.

The impulse signal used on the UWB scheme is an extremely thin pulse, so that the UWB scheme uses extremely wide band in terms of frequency spectrum. Consequently, the inputted information signal has only a power that is lower than the noise level in each frequency area.

A received signal 905 is mixed with noise, but it can be detected by computing the correlation value between the receive signal and the impulse signal. In addition, because signal spread is performed in many systems, many impulse signals are transmitted for one bit of transmit information. Hence, a receive correlation value 907 of each impulse signal may be integrated by the length of spread sequence (908), thereby further facilitating the detection of the transmit signal.

The signal spread by the UWB transmission scheme has only a power lower than the noise level in each frequency area, so that it is comparatively easy for each communication system based on the UWB transmission scheme to coexist with communication systems based on other communication schemes.

When a communication environment is considered in which, with the recent popularization of information devices such as personal computers (PCs) and installation of many various devices in offices, these devices are interconnected by two or more wireless networks packed in a narrow work environment, thus causing plural wireless networks coexist in same frequency band. The "same frequency band" herein includes the UWB wireless communication scheme, which transfers data by spreading them over a very wide frequency band.

The PHY layer specifications using the 2.4 GHz band signal standardized by the above-mentioned IEEE 802.15.3 must consider the coexistence with other plural wireless communication systems existing in the same frequency band.

Especially, in the case of the UWB wireless communication network, data are transferred by spreading them over an extremely wide band, so that it is highly possible for this network to contend with adjacent wireless communication networks.

On the other hand, an impulse signal train used in the UWB wireless communication scheme has no particular frequency carrier, so that it is difficult to perform a carrier sense operation. Therefore, if the UWB wireless communication scheme is applied as the PHY layer of the IEEE 802.15.3, the carrier sense standardized by this section cannot be used for access control because there is no particularly carrier signal, thereby having to resort to the access control based on time division multiplexing.

If a small-scale wireless network system such as PAN is put into consideration, each network (or base station) is not always fixed, so that, if a new network is constructed in the same space or a network is moved to the same space from another space for example, the problems of the contention between networks and the dynamic assignment of time slots (or resources) must be solved.

For example, Japanese Patent Laid-open No. 2000-299670 assigned to the applicant hereof discloses a network system, by assigning at least one of plural divided slots to a control slot, which transmits the information suitable for the network status and the contents of information to be transmitted.

The above-mentioned disclosed network system is based on a method in which each terminal station reports interfered slots to the control station and the control station circumvents these interfered slots to use the network.

However, this method in which each terminal station reports to the control station requires a means for reporting to the control station from time to time, thereby presenting a problem of increasing the frequency of reporting if there are plural adjacent networks.

In addition, the above-mentioned method, because the usage status of each slot is known by detecting a predetermined synchronous signal, all frame structures used by other networks cannot be understood.

Japanese Patent Publication No. 2,660,189 discloses a method and apparatus capable of dynamically assign a bandwidth to plural cells within a cellular network. However, according to this application, the disclosed method and apparatus must organize plural cell groups called "super cells" such that the interference between cells is minimized. The request for channel band widths is performed in accordance with the user request in each cell, namely, the request from the mobile stations (MS) belonging to each base station (BS). In other words, if plural networks coexist in the same space, the request for channel bandwidths has no relationship with how to solve the problem of contention between the base stations. Further, the above-mentioned Japanese patent publication does not solve the problems of the contention between networks and dynamic assignment of time slots (or resources) in the case where a new network is constructed in the same space or a network moves to this same space from another space.

Japanese Translations of PCT for Patent No. 2001-518766 (WO99/17575) discloses a method in which, by dynamically dividing the data transmitting resources by plural networks, each network divides the assigned resources among its users in accordance with its own channel assigning method. This application is based on the concept in which the operators mutually accommodate the plural frequency channels existing in the same space to operate the network, thereby realizing the dynamic assignment of frequency channels by borrowing the (frequency) bands of different operators in a cellular network.

However, the above-mentioned application treats the problem of dynamic assignment of the transmitting resources between the base stations which are arranged in a fixed manner, so that it is presumed that a minimum time slot be prepared for each network (or base station) from the very start. Further, each network (or base station) arranged in a fixed manner requires the minimum resource assignment for accommodating the users, so that there is no state in which no resource is assigned to the network. In other words, the above-mentioned application does not propose any scheme, procedure, and method for a network newly constructed in the same space or moving thereto from another space to get resources from the state in which no resource is assigned to the network. The above-mentioned application does not refer to any scheme, procedure, and method for a network already constructed in a space to assign resources to a network that newly appears in the same space.

BRIEF SUMMARY OF THE INVENTION

It is therefore a main object of the present invention to provide an excellent wireless communication system which allows the coexistence of a plurality of mutually contending wireless networks and an excellent wireless communication control apparatus and method and an excellent computer program which preferably control the communications operation in each communication network in a communication environment in which a plurality of wireless networks contend with each other.

It is another object of the present invention to provide an excellent wireless communication system which allows the coexistence of a plurality of wireless networks contending with each other in a same frequency band, an excellent wireless communication control apparatus and wireless communication control method, and an a computer program which preferably control the communications operation in each communication network in a communication environment in which a plurality of wireless networks contend with each other in a same frequency band.

It is still another object of the present invention to provide an excellent wireless communication system, an excellent wireless communication control apparatus and wireless communication control method, and an excellent computer program which, if a plurality of personal area networks exist on a same frequency channel, allow the coexistence of these personal area networks by time-division multiplexing transmission frame periods only by performing control between transmission apparatuses which provide control stations.

It is yet another object of the present invention to provide an excellent wireless communication system, an excellent wireless communication control apparatus and wireless communication control method, and an excellent computer program which solve the problems of the contention between networks in the case in which a new network is constructed in a same space or a network moves to the same space from another space, thereby preferably performing dynamic assignment of time slots (or resources).

In carrying out the invention and according to a first aspect thereof, there is provided a wireless communication control apparatus including: a communication control means for performing communication control in accordance with a resource assignment included in a downstream signal of a first network; and a resource assignment means for performing resource assignment in accordance with a transmission request included in an upstream signal of a second network.

In the above-mentioned wireless communication apparatus, it is preferable for the resource assigning means to perform resource assignment to a communication apparatus, which gets under the control of an own apparatus within a scope of resources assigned to the own apparatus.

In carrying out the invention and according to a second aspect thereof, there is provided a wireless communication control method including the steps of: receiving, in a downstream signal, by a first communication terminal, resource assignment information determined by a wireless base station apparatus in accordance with a transmission request from the first communication terminal apparatus; performing communication control in the first communication terminal apparatus in accordance with the resource assignment information; and, performing resource assignment to the second communication terminal apparatus within a scope of resources assigned to the first communication terminal apparatus from the wireless base station apparatus in the first communication terminal apparatus in response to a transmission request from a second communication terminal apparatus under the control of the first communication terminal apparatus.

In the above-mentioned wireless communication control method, it is preferable for the second communication terminal apparatus to recursively perform, in response to the transmission request from an other communication terminal apparatus which gets under the control of the own apparatus, resource assignment to the above-mentioned other communication terminal within a scope of resources assigned to the own apparatus from the first communication terminal apparatus.

According to the wireless communication control apparatus of the first aspect of the invention and the wireless communication control method of the second aspect of the invention, each communication terminal under the control of the wireless base station in the parent network recursively has the wireless base station capabilities and performs resource assignment on each communication terminal under the control of the communication terminal having the wireless base station capabilities within a scope of resources of the own apparatus assigned by the wireless base station. Consequently, the novel constitution may configure two or more networks guaranteed not to interfere each other.

In carrying out the invention and according to a third aspect thereof, there is provided a wireless communication control method for performing resource assignment based on time division multiplexing, including the steps of: assigning a first resource period within a transmission frame to a first station which constitutes a first network with a station which assigns resource period at least to a own station; and assigning a second resource period within the first resource period to a second station which constitutes a second network with at least the first station.

In carrying out the invention and according to a fourth aspect thereof, there is provided a wireless communication system based on time division multiplexing, including: a first station constituting a first network with a station which assigns a resource period to a own station to communicate with an other station constituting the first network; and a second station constituting a second network with at least the first station to communicate with an other station constituting the second network except for at least a portion of a resource period assigned to the first station.

The term "system" herein used denotes a logical connection of a plurality of apparatuses (or a plurality of functional modules for realizing a particular function) and it is not essential whether these apparatuses or functional modules are accommodated in a single housing (this applies to the descriptions below).

In carrying out the invention and according to a fifth aspect thereof, there is provided a wireless communication system in which a wireless networks constituted by a plurality of wireless communication apparatuses and a control station for performing time slot assignment to each of the plurality of wireless communication apparatuses in every predetermined transmission frame period coexist, each of the wireless networks including: a signal detecting means for detecting a signal from an other of the wireless networks; a time slot analyzing means for analyzing a transmission time slot on which guaranteed time slot transmission is performed in an other of the wireless networks on the basis of a signal detected by the signal detecting means; and a time slot assigning means which does not assign a transmission time slot on which guaranteed time slot transmission is performed in an other of the wireless networks to a wireless communication apparatus in an own wireless network.

The above-mentioned time slot assigning means may set the transmission time slot on which guaranteed time slot transmission is performed in an other of the wireless networks as an unassigned area in the own wireless network. The above-mentioned time slot assigning means may clear the setting of the unassigned area in the own wireless network in response to that the signal detecting means does not detect the signal from an other of the wireless networks.

The above-mentioned time slot analyzing means may analyze an unassigned area in an other of the wireless networks and the above-mentioned time slot assigning means may perform time slot assignment within the own wireless network by use of the unassigned area in the other of the wireless networks.

Each wireless network is assigned with a time slot by a control station (or a coordinator) in every transmission frame period.

In carrying out the invention and according to a fifth aspect thereof, upon reception of beacon information from an other network, the control station of a receiving network decodes the received beacon information and, on the basis of the time slot assignment information included in the received beacon information, sets the time slot assigned area (or the time area) as an unassigned area in the own network. Further, by excluding the time slot assigned area (or the time area) used by an other network, the control station of the own network can set again the time slot assigned area (or the time area) for use in the own network.

Consequently, all wireless networks can coexist on a same frequency channel by performing network operations as equals while avoiding interference with each other. (It should be noted that the term "same frequency band" used herein denotes the UWB wireless communication scheme in which data are spread over an extremely wide frequency band for transmission and reception.)

In carrying out the invention and according to a sixth aspect thereof, there is provided a wireless communication control apparatus or method for performing, in a network environment in which a plurality of wireless networks for performing guaranteed time slot transmission in every predetermined transmission frame period between wireless communication apparatuses coexist, time slot assignment of a transmission frame period within the wireless networks, including the steps of: detecting a signal from an other of the wireless networks; analyzing a transmission time slot on which guaranteed time slot transmission is performed in an other of the wireless networks on the basis of the signal detected in the signal detecting step; and not assigning a transmission time on which guaranteed time slot transmission is performed on an other of the wireless networks to a wireless communication apparatus in an own wireless network.

The above-mentioned time slot assigning step may set the transmission time slot on which guaranteed time slot transmission is performed on the other of the wireless networks as an unassigned area within the own wireless network. The above-mentioned time slot assigning step may clear the setting of the unassigned area in the own wireless network in response to that the signal detecting step does not detect the signal from the other of the wireless networks.

The above-mentioned time slot analyzing step may analyze an unassigned area in the other of the wireless networks and the time slot assigning step may perform time slot assignment within the own wireless network by use of the unassigned area in the other of the wireless networks.

According to the wireless communication control apparatus and method of the sixth aspect of the invention, upon reception of beacon information from an other network, the control station of a receiving network decodes the received beacon information and, on the basis of the time slot assignment information included in the received beacon information, sets the time slot assigned area as an unassigned area in the own network. Further, by excluding the time slot assigned area used by other network, the control station of the own network can set again the time slot assigned area for use in the own network.

Consequently, all control stations constituting wireless networks can coexist on a same frequency channel by performing network operations as equals while avoiding interference with each other.

In carrying out the invention and according to a seventh aspect thereof, there is provided a wireless communication system in which a plurality of wireless networks constituted by a plurality of wireless communication apparatuses and a control station for performing time slot assignment to each of the wireless communication apparatuses in every predetermined transmission frame period coexist, at least one of the wireless networks providing: in response to the reception of a request for constructing a new wireless network, a transmission time slot for the new wireless network.

In the wireless communication system according to the seventh aspect of the invention, a parent and daughter relationship as it were is formed between an existing wireless network and a wireless network to be newly constructed, in which the new wireless network operates as the daughter and the existing wireless network supports the construction of the new wireless network as the parent. Namely, in response to the reception by the existing wireless network of a request for constructing a new wireless network, the existing wireless network provides a transmission time slot for the new wireless network, thereby avoiding the interference between the wireless networks to realize the coexistence on a same frequency channel.

Consequently, according to the wireless communication system of the seventh aspect of the invention, if a network for which no time slot is assigned appears as with the case in which a new network is constructed in a same space or an other network moves thereto from an other space for example, the problem of the contention between the networks can be solved and the dynamic assignment of time slots (or resources) can be performed in a preferable manner. Further, each already constructed network can dynamically assign its resources to any network newly appearing in the same space.

Each of the wireless networks may include a setting means for setting a time slot unassigned area to an own wireless network; a transmitting means for transmitting time slot assignment information of the own wireless network; an analyzing means for receiving and analyzing time slot assignment information of an other wireless network; and a assigning means for assigning a time slot of the own wireless network by use of an unassigned area of a time slot in an other wireless network.

The above-mentioned construction request may be a request for participating of an other control station that constructs a new wireless network into the corresponding wireless network or a request from an other control station that constructs a new wireless network for a time slot to a control station of the corresponding wireless network.

Further, information that a transmission time slot has been set to the new wireless network may be included in time slot assignment information such as a beacon signal and notified in the corresponding wireless network, or a transmission frame for notifying the new wireless network of the setting of a transmission time slot may be directly transmitted.

In carrying out the invention and according to the eighth aspect thereof, there is provided a wireless communication control apparatus or method for performing, in a network environment in which a plurality of wireless networks for performing guaranteed time slot transmission in every predetermined transmission frame period between wireless communication apparatuses coexist, time slot assignment in a transmission frame period in the wireless networks, wherein a request for constructing a new wireless network is transmitted to any of the existing wireless networks.

In carrying out the invention and according to a ninth aspect thereof, there is provided a wireless communication control apparatus or method for performing, in a network environment in which a plurality of wireless networks for performing guaranteed time slot transmission in every predetermined transmission frame period between wireless communication apparatuses coexist, time slot assignment in a transmission frame period in the wireless networks, wherein in response to the reception of a request for constructing a new wireless network, a transmission time slot for the new wireless network is set.

The wireless communication control apparatus implementing the eighth aspect of the invention functions as the control station of the daughter network and the wireless communication control apparatus implementing the ninth aspect of the invention functions as the control station of the parent network, so that the interference between the networks can be avoided, thereby realizing the coexistence on a same frequency channel.

For example, if the daughter network has been newly constructed in a same space of the parent network or the daughter network has moved to a same space of the parent network, no time slot is initially assigned to the daughter network at all, but the contention between the networks can be solved and a time slot (or resources) can be assigned to the daughter network in a preferable manner in the novel constitution.

The above-mentioned construction request may be a request for participating of an other control station that constructs a new wireless network into the corresponding wireless network or a request from an other control station that constructs a new wireless network for a time slot to a control station of the corresponding wireless network.

Further, information that a transmission time slot has been set to the new wireless network may be included in time slot assignment information such as a beacon signal and notified in the corresponding wireless network, or a transmission frame for notifying the new wireless network of the setting of a transmission time slot may be directly transmitted.

In carrying out the invention and according to a tenth aspect thereof, there is provided a computer-readable program for executing, on a computer system, processing of performing, in a network environment in which a plurality of wireless networks for performing guaranteed time slot transmission in every predetermined transmission frame period between wireless communication apparatuses coexist, time slot assignment in a transmission frame period in the wireless networks, including the steps of: detecting a signal from an other of the wireless networks; analyzing a transmission time slot on which guaranteed time slot transmission is performed in an other of the wireless networks on the basis of the signal detected in the signal detecting step; and not assigning a transmission time slot on which guaranteed time slot transmission is performed on an other of the wireless networks to a wireless communication apparatus in an own wireless network.

In carrying out the invention and according to an eleventh aspect thereof, there is provided a computer-readable program for executing, on a computer system, processing of performing, in a network environment in which a plurality of wireless networks for performing guaranteed time slot transmission in every predetermined transmission frame period between wireless communication apparatuses coexist, time slot assignment in a transmission frame period in the wireless networks, including the steps of: receiving a request for constructing a new wireless network; performing time slot assignment with a time slot unassigned area set in an own wireless network in response to the construction request; and transmitting time slot assignment information in the own wireless network.

In carrying out the invention and according to a twelfth aspect of thereof, there is provided a computer-readable program for executing, on a computer system, processing of performing, in a network environment in which a plurality of wireless networks for performing guaranteed time slot transmission in every predetermined transmission frame period between wireless communication apparatuses coexist, time slot assignment in a transmission frame period in the wireless networks, including the steps of: transmitting a request for constructing a new wireless network to any of the existing wireless networks; receiving time slot assignment information from any of the existing wireless networks; and performing time slot assignment in an own wireless network on the basis of the time slot assignment information.

The computer programs of the tenth through the twelfth aspects of the invention define computer-readable programs, which realize predetermined processing on a computer system. In other words, installing the computer program of the tenth aspect of the invention on a computer system realizes a cooperative operation on the computer system to obtain the same effects as those provided by the wireless communication system of the fifth aspect of the invention. Installing the computer programs of the eleventh and twelfth aspects of the invention on a computer system realizes a cooperative operation on the computer system to obtain the same effects as those of the seventh aspect of the invention.

These and other objects of the invention will be seen by reference to the description, taken in connection with the accompanying drawing.

BRIEF DESCRIPTION OF THE DRAWINGS

FIG. 1 schematic diagram conceptually illustrating a configuration of a wireless communication system practiced as a first embodiment of the invention.

FIG. 2 is a block diagram illustrating a configuration of a communication terminal apparatus, which operates as a wireless base station for performing wireless communication with other communication terminal apparatuses within a wireless network associated with the first embodiment of the invention.

FIG. 20 is a diagram illustrating an example of data transmission based on the UWB scheme.

DETAILED DESCRIPTION

Figure 3:
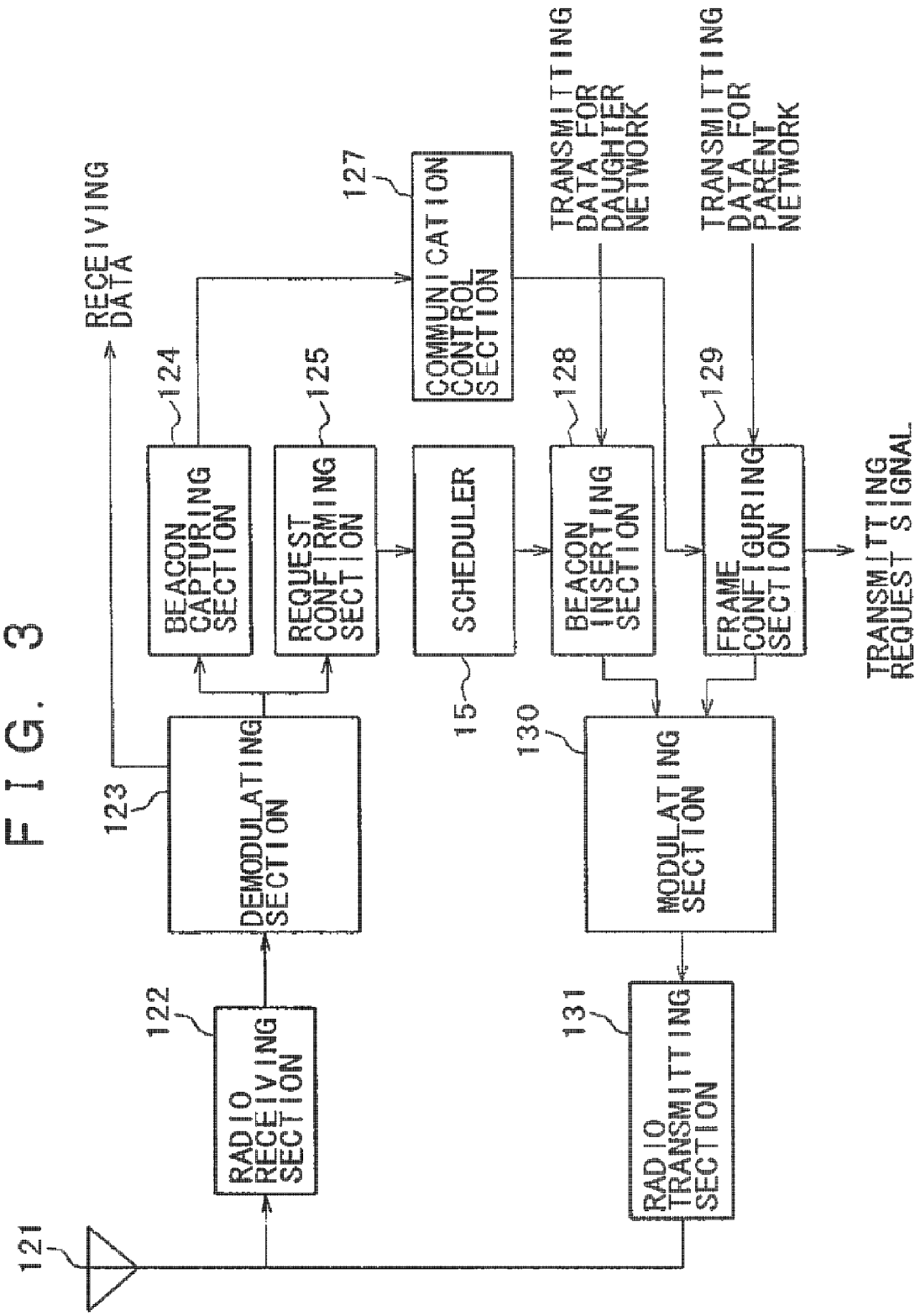
FIG. 3 is a block diagram illustrating a configuration of a communication terminal apparatus, which operates as a user station for performing wireless communication under the control of a base station.

Best Mode for Carrying out the Invention

This invention will be described in further detail by way of example with reference to the accompanying drawings.

A. The First Embodiment

Now, referring to FIG. 1, there is shown a conceptual configuration of a wireless communication system practiced as a first embodiment of the invention.

As shown in FIG. 1, a wirelessly base station (hereafter abbreviated as a BS) wireless communicates with three mobile stations (hereafter abbreviated as MSs), which provide user stations of this wireless base station, namely MS-A (user A), MS-B (user B), and MS-C (user C). BS, MS-A, MS-B, and MS-C constitute the parent network. One mobile station MS-A has the capabilities of a wireless base station and wirelessly communicates with two mobile stations MS-D and MS-E, which are the user stations of the MS-A. The mobile station MS-A operating as a base station and the mobile stations MS-D and MS-E constitute the daughter network.

Although not shown, the other mobile stations MS-B and MS-C may also have the base station capabilities. Namely, these mobile stations may constitute a daughter network by using other MSs as slaves. Obviously, the MS-D or MS-E in the daughter network configured with the MS-A used as a slave may constitute a grandchild network by using other MSs as slaves.

Referring to FIG. 2, there is schematically shown a configuration of a communication terminal apparatus, which operates as a wireless base station for wirelessly communicating with other communication terminal apparatuses within a wireless network associated with the present invention.

An upstream signal transmitted from an MS is received by a radio receiving section 112 via an antenna 111. The radio receiving section 112 performs predetermined radio receiving processing (for example, down-conversion and A/D conversion) on the received upstream signal and outputs the processed upstream signal to a demodulating section 113.

The demodulating section 113 demodulates this processed signal to output receiving data. The demodulating section 113 also demodulates a random access channel (RACH) signal received from an MS to output a transmitting request signal to a request confirming section 114. The request confirming section 114 confirms a transmitting request by the RACH signal from each MS to output, to a scheduler 115, information about which MS has issued the transmitting request.

The scheduler 115 performs resource assignment of the MS from which the transmitting request has been issued and outputs the resource assignment information to a beacon inserting section 116. The beacon inserting section 116 inserts the resource assignment information obtained in the scheduler 115 into the transmitting data and outputs the transmitting data to a modulating section 117 as a transmitting signal.

The modulating section 117 modulates the transmitting signal and outputs the modulated send signal to a radio transmitting section 118. The radio transmitting section 118 performs predetermined radio transmitting processing (for example, D/A conversion and up-conversion) on the modulated signal and transmits the resultant signal to the MS via the antenna 111 as a downstream signal.

Referring to FIG. 3, there is schematically shown a configuration of a communication terminal apparatus, which operates as a user station for performing wireless communication under the control of a base station in the wireless communication network associated with the invention.

A downstream signal transmitted from a BS or an MS functioning as a BS is received by a radio receiving section 122 via an antenna 121. The radio receiving section 122 performs predetermined radio receiving processing (for example, down-conversion and A/D conversion) on the received signal and outputs the resultant signal to a demodulating section 123.

The demodulating section 123 demodulates the processed signal to output receiving data. The demodulating section 123 also demodulates a random access channel (RACH) signal received from the MS (MS-D or MS-E) of the daughter network, which becomes the slave of own apparatus and outputs the demodulated signal to a request confirming section 125 as a transmitting request signal. Further, the demodulating section 123 demodulates a beacon signal contained in the downstream signal from the BS and outputs the demodulated beacon signal to a beacon capturing section 124.

The beacon capturing signal 124 reads the beacon resource assignment information contained in the downstream signal transmitted from the BS or an MS functioning as the BS to recognize how the resource is assigned. This resource assignment information is outputted to a communication control section 127. On the basis of the resource assignment information, the communication control section 127 controls a frame configuring section 29 so as to perform time division multiple access (TDMA) communication. The frame configuring section 129 frame-configures the transmitting data for the parent network and outputs the configured data to a modulating section 130. Also, when performing a transmitting request operation on the BS or a MS functioning as the BS, the frame configuring section 129 inserts a transmitting request signal into the transmitting data for the parent network.

The request confirming signal 125 confirms the transmitting request by the RACH signal from each MS and outputs, to a scheduler 126, the information about which MS has transmitted the transmitting request. The scheduler 126 performs resource assignment for the MS from which the transmitting request has come and outputs the information about this resource assignment to a beacon inserting section 128. The beacon inserting section 128 inserts the beacon signal, which is the identification signal including the resource assignment information obtained by the scheduler 126, into the transmitting data for the daughter network and outputs the resultant data to the modulating section 130.

The modulating section 130 modulates the transmitting signal for the parent network and the transmitting signal for the daughter network and outputs the modulated signals to radio transmitting section 131. The radio transmitting section 131 performs predetermined radio transmitting processing (for example, D/A conversion and up-conversion) on the modulated signals and transmits the processed signals to the BS or the MS functioning as the BS via an antenna 121 as an upstream signal.

Figure 4:
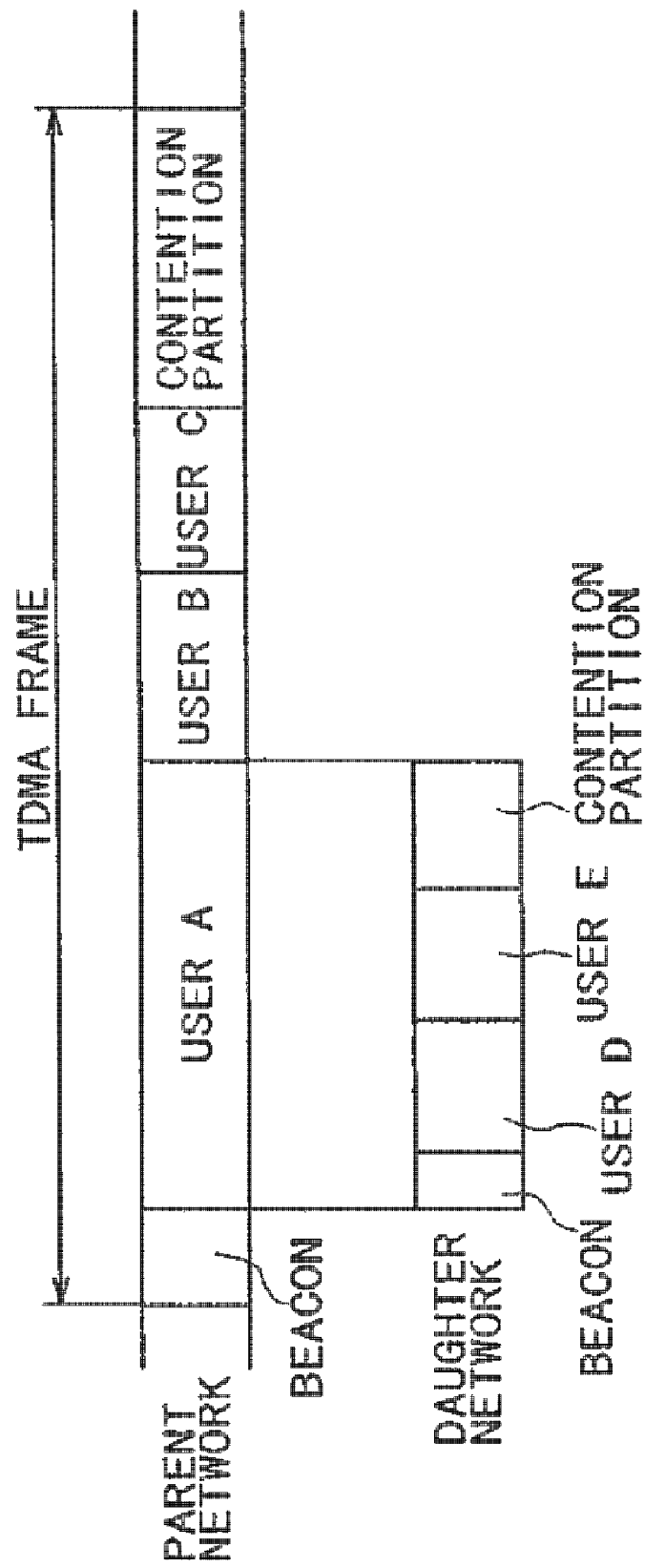
FIG. 4 is a diagram illustrating an exemplary configuration of a TDMA frame for use in the wireless network associated with the first embodiment of the invention.

Referring to FIG. 4, there is shown a configuration of a TDMA frame for use in the wireless network associated with the present embodiment. The following describes in detail a wireless communication method according to the present embodiment with reference to this figure. It should be noted that the communication terminal apparatus shown in FIG. 3 is MS-A.

First, as shown in the upper portion of FIG. 4, the BS shown in FIG. 1 assigns resources to user A, user B, and user C. Namely, the beacon is followed by user A, user B, and user C, in this order. This resource assignment information is contained in the beacon of the parent network.

The beacon of the parent network is sent from the BS to each MS. In MS-A, the beacon is read by the beacon capturing section 124 to recognize that the resource assignment to the MS-A is made immediately after the beacon. The information about this resource assignment is sent to the communication control section 127. The communication control section 127 performs control so that the communication with the BS is made during a period in which the resource is assigned.

The MS-A accepts resource requests (transmitting requests) from the MS-D and the MS-E, which become the slaves of the MS-A. These transmitting requests are made by the RACH in the contention partition of the daughter network.

Then, the MS-A confirms the transmitting requests from the MS-D and the MS-E through the request confirming section 125 and sends the confirmed transmitting requests to the scheduler 126. The scheduler 126 performs resource assignment on the MSs (in this example, MS-D and MS-E) from which the transmitting requests have come. In this case, the MS-A assigns the resources to the user stations of MS-D and MS-E, which are the slaves of MS-A, within the scope of the resources assigned to the MS-A by the BS.

The information about the resource assignment determined by the MS-A is sent to the MS-D and the MS-E by the beacon in the downstream signal of the daughter network. Thus, as shown in the lower portion of FIG. 4, the resource assignment is performed on the user D and the user E. Namely, the resource assignment is performed on the user D and the user E in this order after the beacon.

Consequently, because the resource assignment is performed on the slave communication terminals within the scope of the resources assigned to the master apparatus, the interference and disturbance between networks can be avoided and prevented if they are configured in a same or adjacent area.

In the communication based on the above-mentioned TDMA frame, the MS (MS-A, MS-B, or MS-C) of the parent network requests the resource assignment (the transmitting request) in the next frame by the RACH in the contention partition and the BS performs the resource assignment of the next frame in response to the request and notifies the requesting MS (MS-A, MS-B, or MS-C) of the resource assignment in the next beacon. Then, the MS (MS-A, MS-B, or MS-C) performs communication based on the resource assignment information carried by the beacon.

The MS (MS-D or MS-E) of the daughter network requests the resource assignment (the transmitting request) in the next frame by the RACH in the contention partition and the MS-A performs the resource assignment of the next frame in response to this request, notifying the MS (MS-D or MS-E) of the resource assignment by the next beacon. Then, the MS (MS-D or MS-E) performs communication based on the resource assignment information carried by the beacon.

Thus, in the present embodiment, each communication terminal, which is the slave of the wireless base station in the parent network, recursively has the wireless base station capabilities and constructs a daughter network within a scope of the own apparatus's resources assigned by the wireless base station, thereby performing resource assignment on its slave communication terminals. This novel constitution allows configuring two or more networks, which are guaranteed not be interfered each other. In addition, according to the present invention, the area of networks may be expanded without involving the increase in equipment scale.

Meanwhile, for new wireless technologies, which can effectively use frequency resources, the ultra wide band (UWB) transmission scheme has recently been drawing attention. Basically, the ultra wide band transmission scheme performs base band transmission by use of a signal based on pulse trains, each pulse having a very short pulse width (for example, less than 1 ns (nanosecond). Its occupied bandwidth is on the GHz order so that the value obtained by dividing the occupied frequency bandwidth by its center frequency (for example, 1 GHz to 10 GHz) becomes about 1. Therefore, the bandwidth of this scheme is ultra wide as compared with those bandwidths used in wireless LANs based on the so-called W-CDMA scheme, cdma 2000 scheme, and SS (Spread Spectrum) and OFDM (Orthogonal Frequency Division Multiplexing).

In addition, the ultra wide band transmission scheme is characterized by that, due to its lower signal power density characteristic, existing wireless systems having a high signal power density characteristic to a particular frequency band are hardly interfered. Therefore, this scheme is expected as a technology, which can be overlaid on the frequency band used by existing wireless systems. Further, because of its wide band characteristic, the ultra wide band transmission scheme is highly prospective as an ultra high-speed wireless transmission technology of 100 Mbps level for use in the personal area network (PAN).

On the other hand, in the UWB wireless transmission, if it is assumed that two or more UWB wireless networks uncoordinated to each other exist in a same area, each network performs communication at a low signal power density by use of overlapping ultra wide band occupied bands, so that a heavy interference may be caused depending on the positional relationships of the transmitting and receiving apparatuses. When the wireless communication scheme according to the present embodiment is applied to the UWB wireless transmission, no resource overlapping is caused to effectively avoid interference, thereby allowing performing the UWB wireless transmission without causing the networks to disturbance each other.

In the above-mentioned embodiment, there are three MSs, which are the slaves of the BS and two MSs, which are the slaves of the MS-A. It will be apparent that the present invention is not limited to this configuration. The communication terminals MS-D and MS-E may also have the wireless base station capabilities and configure a grandchild network within a scope of the resources assigned to the own apparatus, thereby recursively assigning the resources to the slave communication terminals.

In the above-mentioned embodiment, in the state where the communication terminal MS-A is configuring a daughter network with its slave communication terminals, the communication terminals MS-B and MS-C may also have the wireless base station capabilities to concurrently configure their daughter networks within a scope of the resources assigned to these communication terminals MS-B and MS-C. In this case, the resource scopes of these daughter networks do not overlap either, so that no disturbance takes place between the daughter networks.

B. The Second Embodiment

Figure 5:
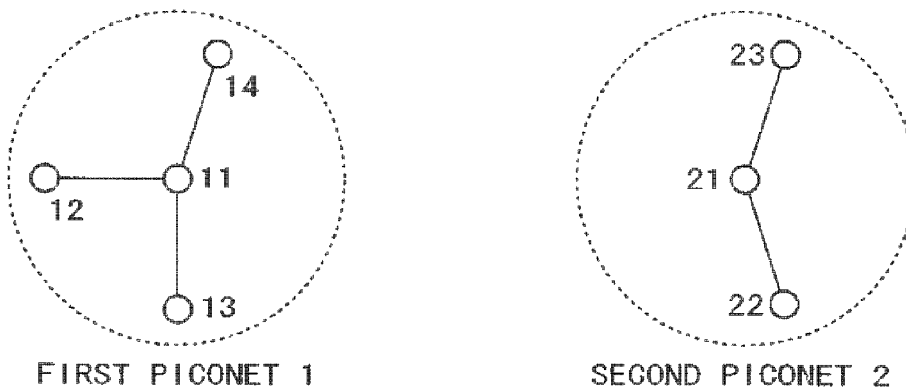
FIG. 5 is a diagram illustrating how two personal area networks exist as spaced from each other.

Referring to FIG. 5, there is shown the existence of two personal area networks spaced from each other. In what follows, a small-scale personal area network is also called a "piconet."

In the figure, the first piconet 1 is constituted by a first control station 11 called a coordinator and a plurality of wireless communication apparatuses 12, 13, 14, and so on which constitute the first piconet 1. The second piconet 2 is constituted by a second control station 21 called a coordinator and a plurality of wireless communication apparatuses 22, 23, and so on, which constitute the second piconet 2.

The service area of each of the first piconet 1 and the second piconet 2 is a range of radio transmitted from the control station (indicated by dashed lines). Therefore, it will be understood that the first piconet 1 and the second piconet 2 exist on the same frequency channel without spatially interfering each other.

Figure 6:
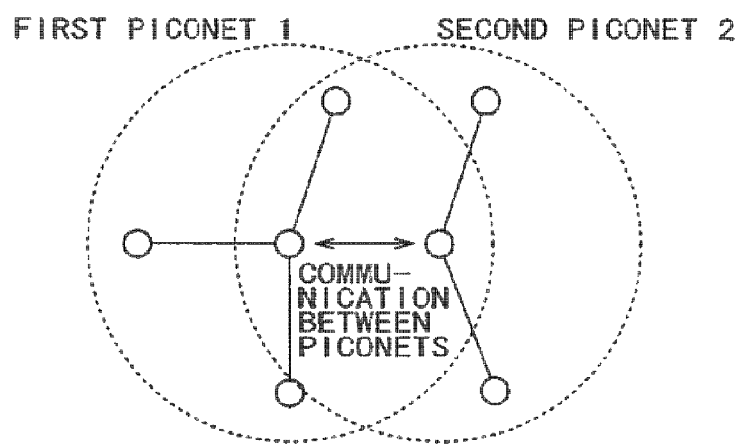
FIG. 6 is a diagram illustrating how a first piconet 1 and a second piconet 2 exist as spatially overlapped.

Referring to FIG. 6, there is shown a state in which the first piconet 1 and the second piconet 2 exist in a spatially overlapping manner.

In the figure, the service area of each of the first piconet 1 and the second piconet 2 is a range of radio transmitted from the control station (indicated by dashed lines). Therefore, it will be understood that the service areas of the first piconet 1 and the second piconet 2 are spatially overlapping each other.

In the case shown in FIG. 6, if the first piconet 1 and the second piconet 2 exist on a same frequency channel, the information can be received from the other piconet. If the first piconet 1 and the second piconet 2 independently perform guaranteed time slot transmission of the same time, a problem of the collision of the information about both piconets occurs.

In order to overcome this problem, the second embodiment of the invention provides a scheme by which the control stations (or coordinators) 11 and 12 of the first piconet 1 and the second piconet 2 perform communication so that the collision between the control stations in these piconets is avoided as indicated by the bi-directional arrows shown. For example, one piconet understands the state of guaranteed time slot of the other piconet from the beacon information and sets the time used for information transmission by the other piconet as an unassigned area of the own piconet, thereby allowing the coexistence of both piconets on a same frequency channel for piconet operation.

Figure 7:
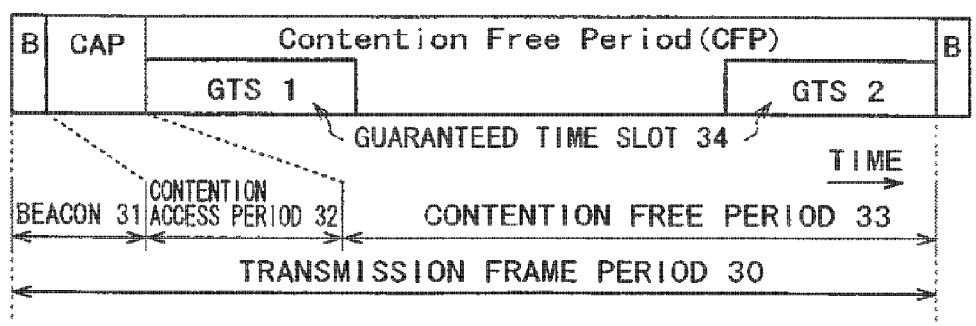
FIG. 7 is a diagram illustrating a configuration of a transmission frame for use in a piconet associated with a second embodiment of the embodiment.

Referring to FIG. 7, there is shown a configuration of a transmission frame for use in the piconets associated with the present embodiment.

In the figure, a transmission frame 30 is constituted by a beacon broadcast area (B) 31 in which a beacon is broadcast from the control station to the network at the beginning of the frame, a content access period (CAP) 32 in which information about the processing to be executed when getting into the network for example is exchanged, and a contention free period (CFP) 33 in which each wireless communication apparatus performs guaranteed time slot for information transmission. A period up to a next network broadcast area is provided as one transmission frame period.

The configuration inside of the transmission frame is written in the beacon information, which is broadcast onto the network at the beginning of the frame.

It should be noted that, in accordance with the specifications standardized by the IEEE 802.15.3, the time slot assignment transmission by the guaranteed time slot (GTS) 34 is directly performed between any wireless communication apparatuses in the wireless network 1 in accordance with a multiplex transmission method called dynamic TDMA (Time Division Multiple Access) in the contention free period 23.

Figure 8:
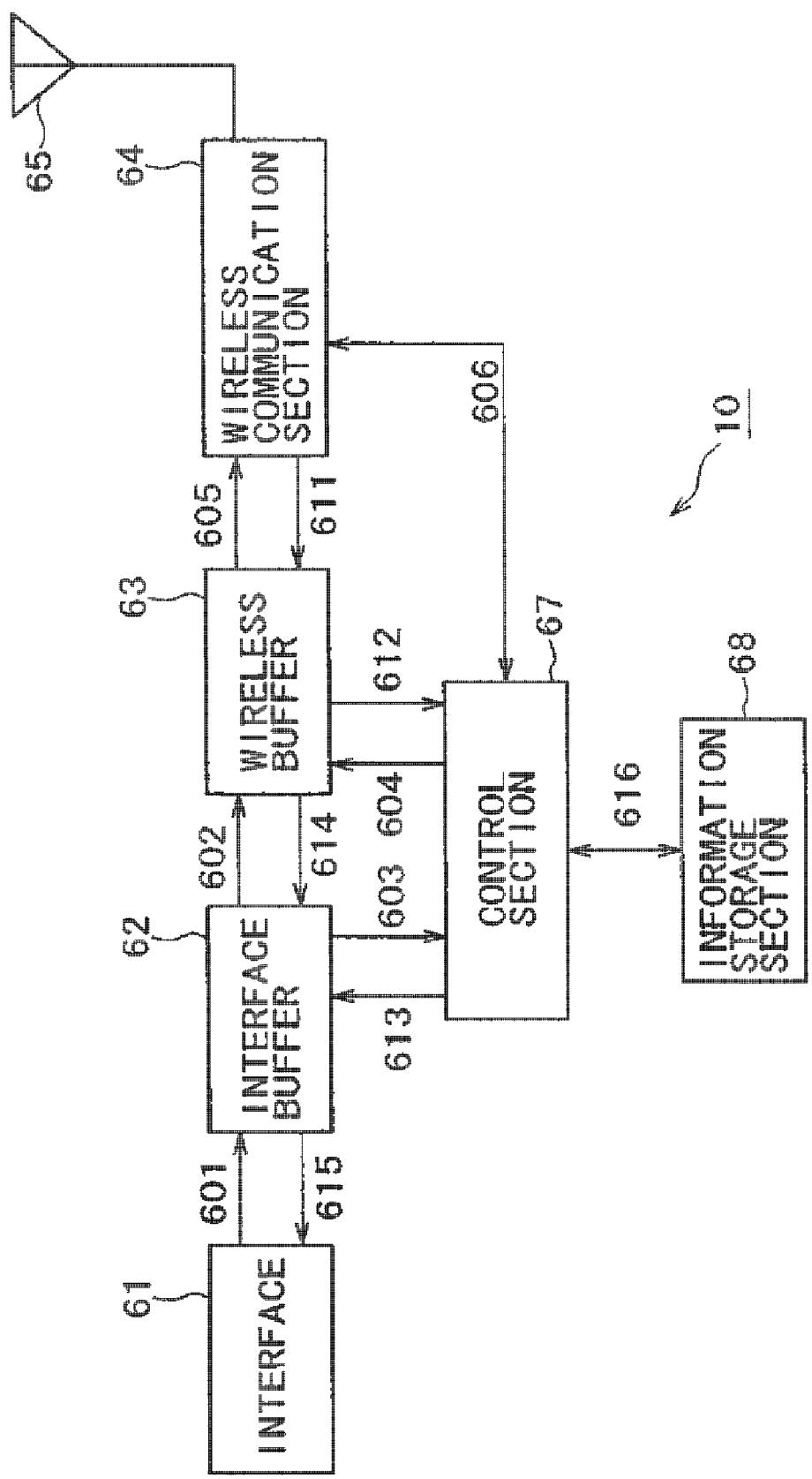
FIG. 8 is a block diagram illustrating a configuration of a wireless communication apparatus 10, which operates in the piconet associated with the second embodiment of the invention.

Referring to FIG. 8, there is shown a schematic diagram of a configuration of a wireless communication apparatus 10, which operates in the piconet associated with the present embodiment. As shown, the wireless communication apparatus 10 is constituted by an interface 61, an interface buffer 62, a wireless buffer 63, a wireless communication section 64, an antenna 65, a control section 67, and an information storage section 68.

The interface 61 connects the wireless communication apparatus 10 to external equipment such as a personal computer (PC). The interface buffer 62 holds media information 601 received from external equipment. The wireless buffer 63 holds information 602 for wireless transmission received from the interface buffer 62 as a wireless transmission packet.

The control section 67 controls the sequence of data transmission processing in the wireless communication apparatus 10 in a centralized manner. Namely, in response to a notification 603 for wireless transmission, the control section 67 stores a reservation request 604 in the wireless buffer 63 of wireless transmission if guaranteed time slot transmission is required and sends this request to a control station 10-8 by use of the contention access period (CAP) in the transmission frame. Namely, in this configuration, the reservation request 605 for transmission is wirelessly transmitted from the antenna 65 via the wireless communication section 64.

A signal received by the wireless communication apparatus 10 is supplied to the wireless communication section 64 via the antenna 65 to be sent to the wireless buffer 63 as a decoded signal 611.

Further, if a signal is received by the wireless communication apparatus 10, which provides a control station, the received signal is supplied to the control section 67 as a control signal 612. The control section 67 determines whether the signal is a reservation request from another wireless communication apparatus constituting the piconet. The time slot assignment information based on this decision is constituted as a beacon signal, and is wirelessly transmitted at the beginning of the frame period (refer to FIG. 7). Namely, the beacon signal 605 of that frame is wirelessly transmitted into the piconet from the antenna 65 via the wireless communication section 64.

Receiving the beacon signal from the other piconet, the wireless communication apparatus 10 can analyze the beacon information by the control section 67 and set the area, which affects the information transmission of the other piconet, as an unassigned area in the own piconet.

The beacon signal 605 including the specification of such an unassigned area is wirelessly transmitted into the piconet from the antenna 65 via the wireless communication section 64.

In wireless transmitting apparatus other than the control station in the piconet, when the beacon information transmitted from the control station almost periodically is received, the control section 67 confirms the corresponding guaranteed time slot assignment information of the contention free period (CFP) described in this beacon information and sets wireless communication section 64 in accordance with the instruction specified in the assignment information, thereby transmitting the wireless transmission packet stored in the wireless buffer 63.

If the reception in the contention free period (CFP) is not specified in the beacon information transmitted from the control station, each wireless transmission apparatus other than the control station sets the wireless communication section 64 in accordance with that instruction to perform signal reception in a predetermined times relation. The received information 611 is held in the wireless buffer 63. Then, the control section 67 reconstructs the information 614 received on a frame period basis in accordance with the frame period signal 604 and passes the reconstructed information to the interface buffer 62. The interface 61 passes the received information to external equipment (not shown) as predetermined interface format information 615.

The above-mentioned sequence of control operations is performed as instructed by the control section 67. The control section 67 has the information storage section 68 for storing various transmission control programs and control information. In order to reference these pieces of information from time to time, the control section 67 specifies a command group 616 with the information storage section 68.

Figure 9:
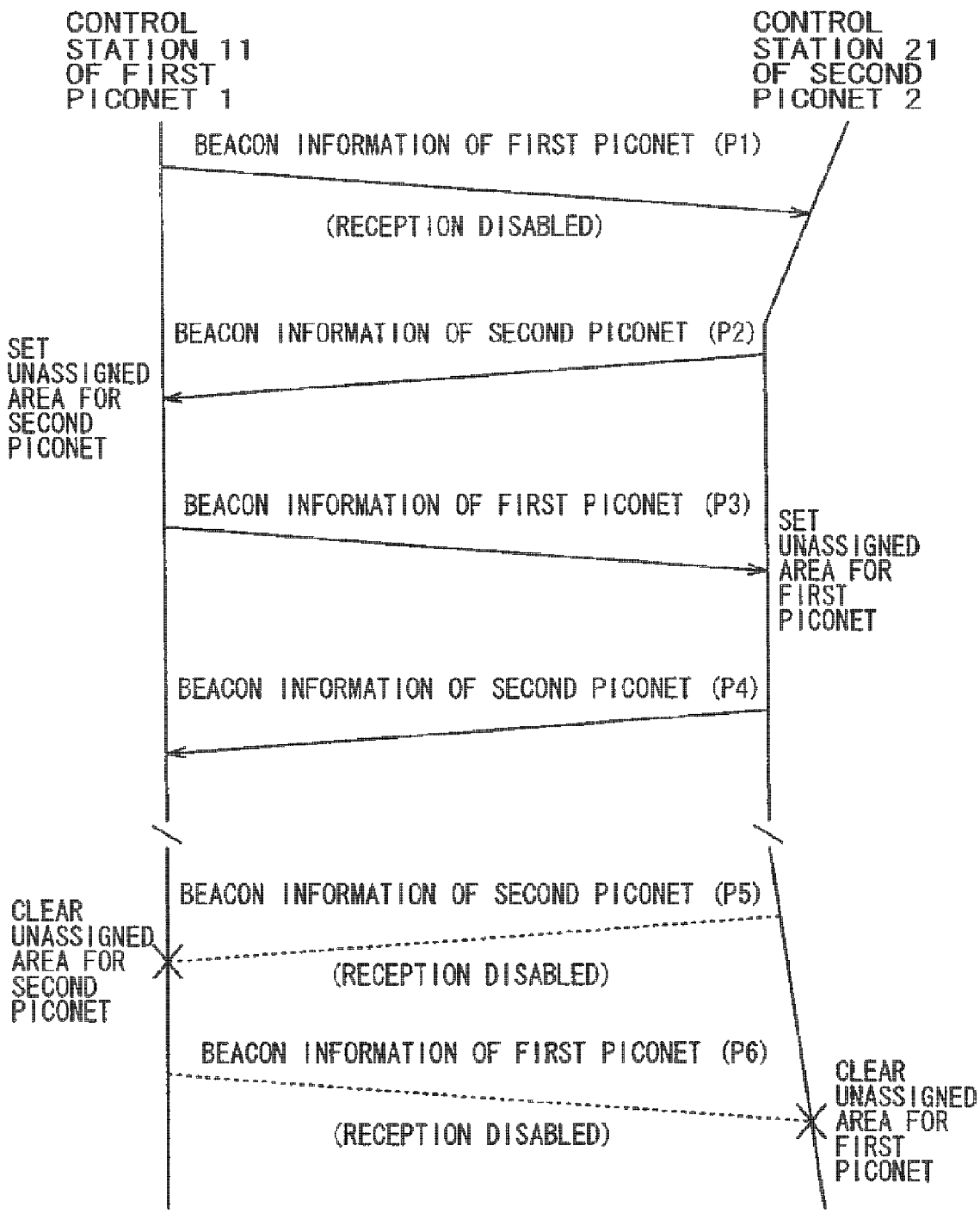
FIG. 9 is a diagram illustrating an example of an operation sequence between a control station 11 of the first piconet 1 and a control station 21 of the second piconet.

Referring to FIG. 9, there is shown an example of an operation sequence to be performed between the first control station 11 of the first piconet 1 and the control station 21 of the second piconet 2. To be more specific, FIG. 9 shows a procedure of setting unassigned areas in the first piconet 1 and the second piconet 2 while receiving the beacon information by the control station 11 of the first piconet 1 and the control station 21 of the second piconet 2. In the example shown, it is assumed that the control station 11 and the control station 21 of the first piconet 1 and the second piconet 2 operate as equals by following the processing procedure shown in FIG. 14. It is also assumed that, in each piconet, a certain wireless communication apparatus is set as a control station by following a predetermined process.

First, the first control station 11 of the first piconet 1 sends beacon information of the first piconet 1 (P1).

The control station 21 of the second piconet 2 cannot receive this beacon information. For example, if the first piconet 1 and the second piconet 2 are separated enough, each cannot receive the beacon information of the other. In such a case, piconets are formed independently of each other (refer to FIG. 5).

Next, the control station 21 of the second piconet 2 sends the beacon information of the second piconet 2 (P2).

If the first piconet 1 and the second piconet 2 are close enough to each other, the beacon information of the other can be received (refer to FIG. 6). When the beacon information from the control station 21 is received, the control station 11 of the first piconet 1 sets the unassigned area for the second piconet 2.

Then, the control station 11 of the first piconet 1 sends the beacon information of the first piconet 1, which includes the setting of the unassigned area (P3).

If the beacon information from the control station 11 is received, the control station 21 of the second piconet 2 sets an unassigned area for the first piconet 1.

Next, the control station 21 of the second piconet 2 sends the beacon information of the second piconet 2, which includes the setting of the unassigned area (P4).

Thus, while operating as equals, the control station 11 and the control station 21 of the first piconet 1 and second piconet 2 allow the coexistence of a plurality of piconets on the same frequency channel by performing time division multiplexing on them. Obviously, in the UWB wireless communication scheme in which data are spread over an extremely wide frequency band, a plurality of piconets can be made coexist by performing the above-mentioned time slot assignment.

Then, if the control station 11 of the first piconet 1 cannot receive the beacon information of the second piconet 2 because of a dynamic change in the communication environment (for example, the movement of the wireless communication apparatus) (P5), the control station 11 of the first piconet 1 can clear the setting of this unassigned area.

Likewise, if the control station 21 of the second piconet 2 cannot receive the beacon information of the first piconet 1 (P6), the control station 21 of the second piconet 2 can clear the setting of the unassigned area.

FIGS. 10 through 13 show the processes of setting unassigned areas by each of the first piconet 1 and the second piconet 2 in terms of the transmission frame configurations of the first piconet 1 and the second piconet 2.

Figure 10:
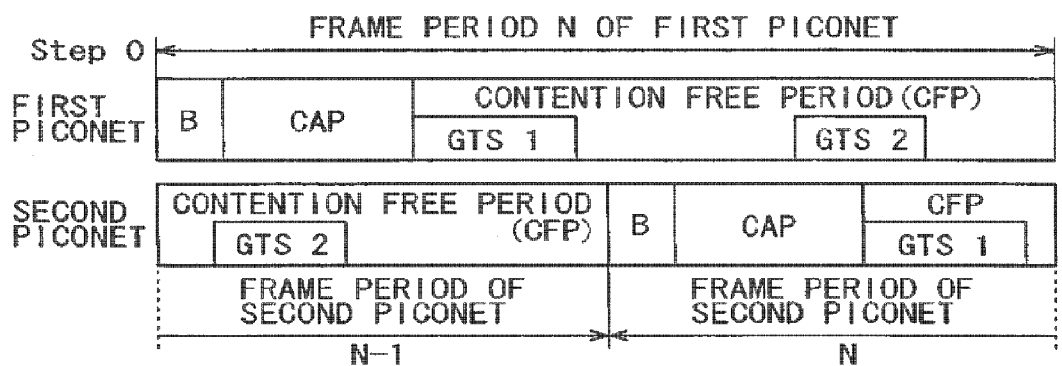
FIG. 10 is a diagram illustrating a configuration of a transmission frame for use in a process of setting an unassigned area in each of the first piconet 1 and the second piconet 2.

At the stage shown in FIG. 10, neither the first piconet 1 nor the second piconet 2 sets an unassigned area, but each is operating by individually performing GTS assignment in its CFP area. Therefore, in none of the transmission frames of the first piconet 1 and the second piconet 2, the unassigned area for the other piconet is not set.

Figure 11:
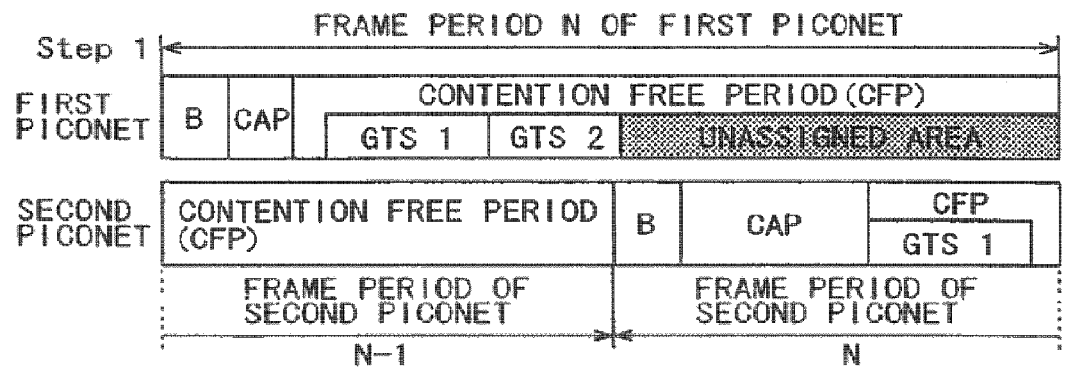
FIG. 11 is a diagram illustrating a configuration of a transmission frame for use in a process of setting an unassigned area in each of the first piconet 1 and the second piconet 2.

At the stage shown in FIG. 11, the control station 11 of the first piconet 1 receives the beacon information of the second piconet 2 and sets, to the transmission frame of the first piconet 1, the unassigned area for the second piconet 2.

In the example shown, the first piconet 1 performs the GTS assignment in the own piconet in the CFP area in a concentrated manner and, by minimizing the length of the CAP area, sets a half of the frame period as an unassigned area.

Figure 12:
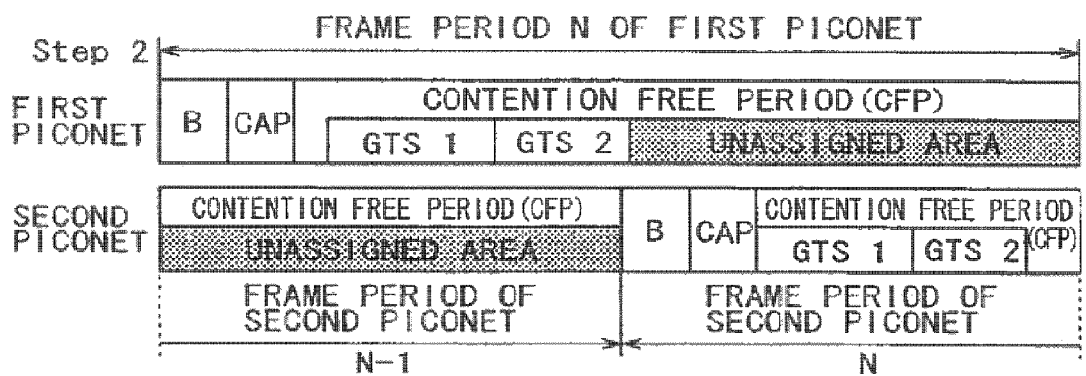
FIG. 12 is a diagram illustrating a configuration of a transmission frame for use in a process of setting an unassigned area in each of the first piconet 1 and the second piconet 2.

At the stage shown in FIG. 12, the control station 21 of the second piconet 2 receives the beacon information of the first piconet 1 and sets the unassigned area for the first piconet 1 in the transmission frame of the second piconet 2.

In the example shown, the control station 21 of the second piconet 2 performs the GTS assignment in the CFP area in a concentrated manner except for the portion equivalent to the unassigned area of the first piconet 1. In addition, the control station 21 minimizes the length of the CAP area and sets the area for use by the first piconet 1 as the unassigned area.

Figure 13:
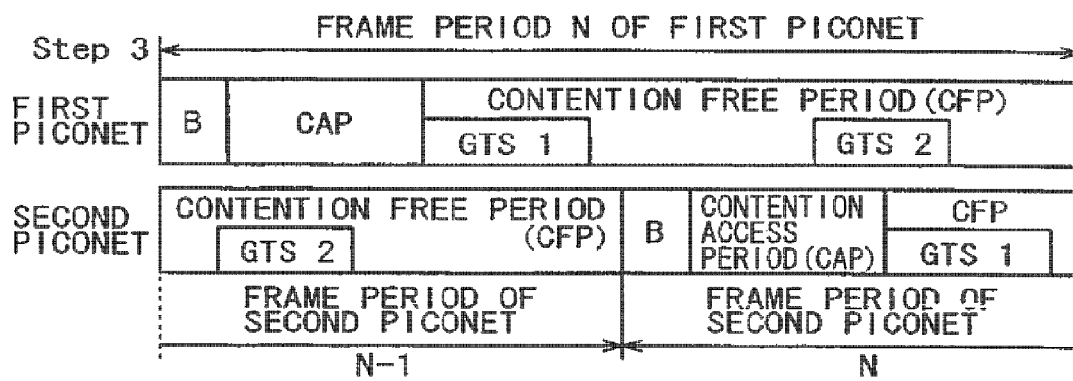
FIG. 13 is a diagram illustrating a configuration of a transmission frame for use in a process of setting an unassigned area in each of the first piconet 1 and the second piconet 2.

A the stage shown in FIG. 13, in response to that the first piconet 1 and the second piconet 2 do not receive the beacon information of each other, the setting of the unassigned area in each piconet is cleared.

In the example shown, each of the first piconet 1 and the second piconet 2 uses the entire frame period for its piconet transmission, so that the GTS assignment in the CFP area is made in a redundant manner and the CAP area is set longer for an enough margin.

In the examples shown in FIGS. 9 through 13, the control stations operate as equals to each other, so that two piconets using a same frequency channels can coexist. Obviously, the equal operation of each control station makes it practical for three or more piconets using a same frequency channel to coexist.

Figure 14:
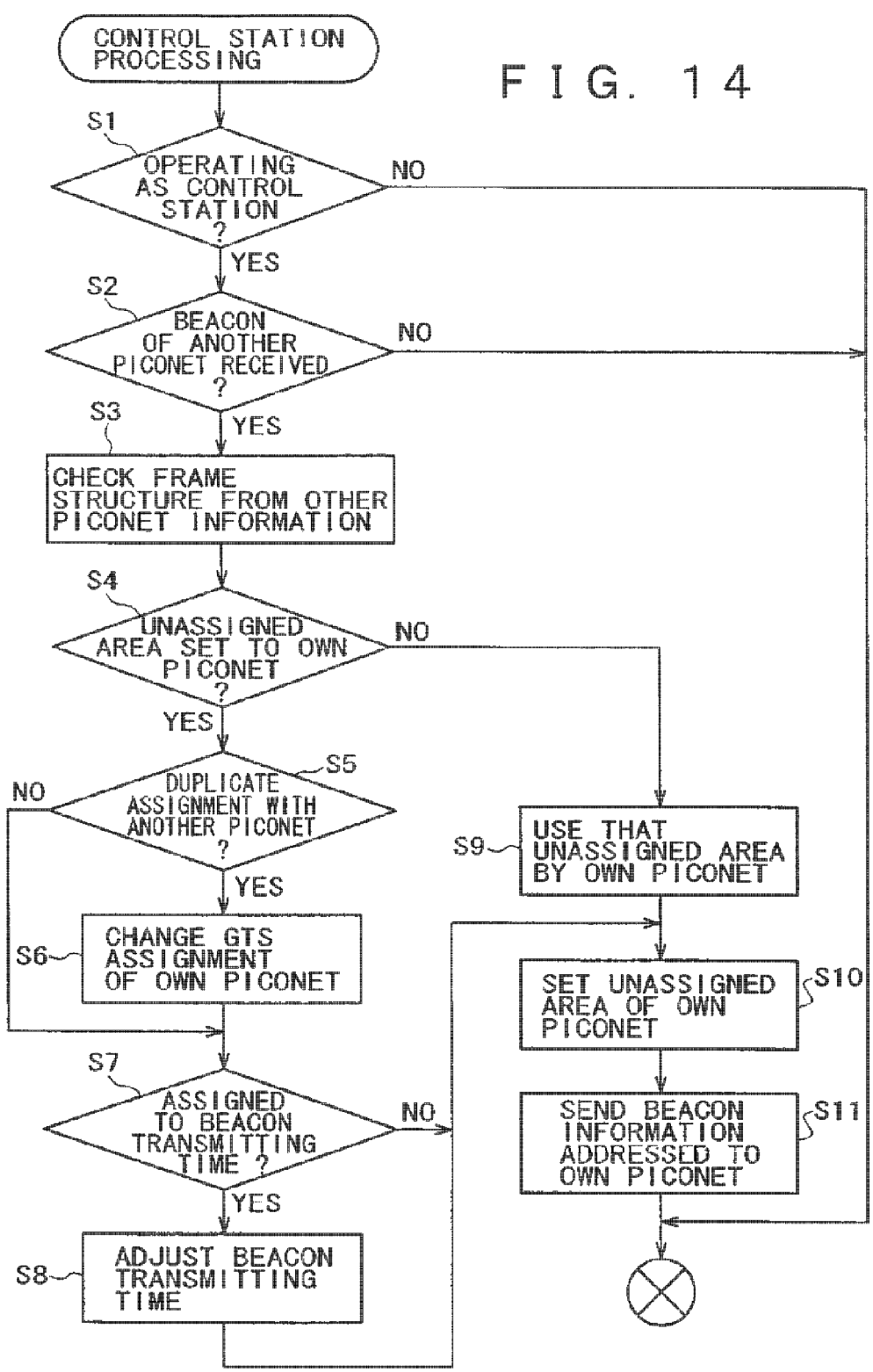
FIG. 14 is a flowchart describing a processing operation of a control station for constructing piconets in order to realize the operation sequence shown in FIG. 9.

Referring to FIG. 14, there is shown a flowchart describing the processing operation of each of the control stations constituting piconets for realizing the operation sequence shown in FIG. 9. Actually, this processing operation is realized by the control section 67 in the wireless communication apparatus 10 set as a control station by executing predetermined program codes.

In step S1, it is determined whether the wireless communication apparatus is operating as the control station. It is assumed that, in each piconet, a certain wireless communication apparatus have become the control station by following a predetermined process. However, the procedure itself for setting the control station in each piconet is not directly associated with the key concept of the present invention, so that the description of this procedure is skipped.

If the wireless communication apparatus is not the control station, the decision of decision block S1 is No and therefore this processing routine comes to an end. On the other hand, if the wireless communication apparatus is found operating as the control station, then it is determined in step S2 whether the beacon information of the other piconet existing around has been received.

If the beacon information of the other piconet is found not received, then the decision of decision block S2 is No, so that this processing routine comes to an end. On the other hand, if the beacon information of the other piconet is found received, then the frame structure of that piconet is confirmed on the basis of the received beacon information in step S3.

In step S4, it is determined whether the unassigned area for the own piconet is set.

If the unassigned area is found set, then this unassigned area is set as an area for use by the own piconet in step S9 and then the procedure goes to step S10.

On the other hand, if the unassigned area is found not set, it is determined in step S5 whether GTS assignment of contention free period (CFP) is duplicated with the other piconet existing around.

If GTS assignment is found duplicate with the other piconet, then the GTS assignment of the own piconet is changed in step S6. If the GTS assignment is found not duplicate, the process of step S6 is skipped.

In step S7, it is determined whether there is GTS assignment in beacon transmitting time.

If GTS is found assigned to the beacon transmitting time, then the beacon transmission time is adjusted in step S8 so that the assignment of the own piconet will not overlap the assignment of the other piconet and then the procedure goes to step S10. If the GTS is not found assigned to the beacon transmitting time, the process of step S8 is skipped and procedure goes to step S10.

In step S10, the unassigned area of the own piconet is set. In step S11, The modification of the frame structure is broadcast into the piconet as the beacon information.

Thus, in the present embodiment, the control stations of the piconets operate as equals to each other to perform the operation sequence shown in FIG. 9, thereby allowing the coexistence of a plurality of piconets using a same frequency channel without interfering each other.

In the UWB wireless transmission, if two or more UWB wireless networks, which are uncoordinated with each other, exist in a same area, each network performs communication at a low signal power density by use of an overlapping ultra wide band occupied band, so that a heavy interference may be caused depending on the positional relationship between the receiving/transmitting apparatuses. On the contrary, if the wireless communication scheme associated with the present invention is applied to UWB wireless networks, no resource duplication occurs, so that the interference can be effectively avoided to allow the wireless transmission between the networks without disturbance.

C. The Third Embodiment

In the above-mentioned second embodiment, a plurality of piconets operate as equals to each other and the control station of each piconet executes the same processing procedure, thereby allowing the plurality of piconets using a same frequency channel to coexist without interfering each other.

In the third embodiment of the invention, a plurality of piconets using a same frequency channel realize coexistence without interfering each other while forming a parent and daughter relationship among them. Namely, the parent piconet assigns a time slot for use for the daughter piconets and the daughter piconets use the time slot assigned by the parent piconet to perform time slot assignment or GTS assignment between the daughter piconets.

In order to establish a parent and daughter relationship between two or more piconets, the control station of each daughter piconet once participates in the parent piconet as a normal terminal station to perform a time slot request operation like other terminal stations in the parent piconet and recursively operate the control station capabilities to assign the time slot obtained in the parent piconet to each of terminal stations in the daughter piconets. Obviously, some of the terminal stations in each daughter piconet may construct grandchild piconets by likewise realizing the recursive control station capabilities.

Also, the control station of the parent piconet may assign time slots (or the parent piconet may prepare an unassigned area) in response to a time slot request from the control station of each daughter piconet regardless of the procedure for participation between the piconets, thereby realizing the coexistence of the piconets without interference therebetween.

Consequently, according to the present embodiment, if a network to which no time slot is assigned occurs in such a case as when a new network is constructed in the same space or a network has moved thereto from another space, the problem of network contention may be solved to suitably perform the dynamic assignment of time slots (or resources). In addition, an existing network may assign resources to a network newly appearing in the same space.

In the case where a parent and daughter relationship is formed between piconets to avoid the interference therebetween as with the present embodiment, the processing operations to be executed by the wireless communication apparatus are different depending on for which of the control station for the parent piconet and the daughter piconet functions, unlike the above-mentioned second embodiment (which will be described later).

Figure 15:
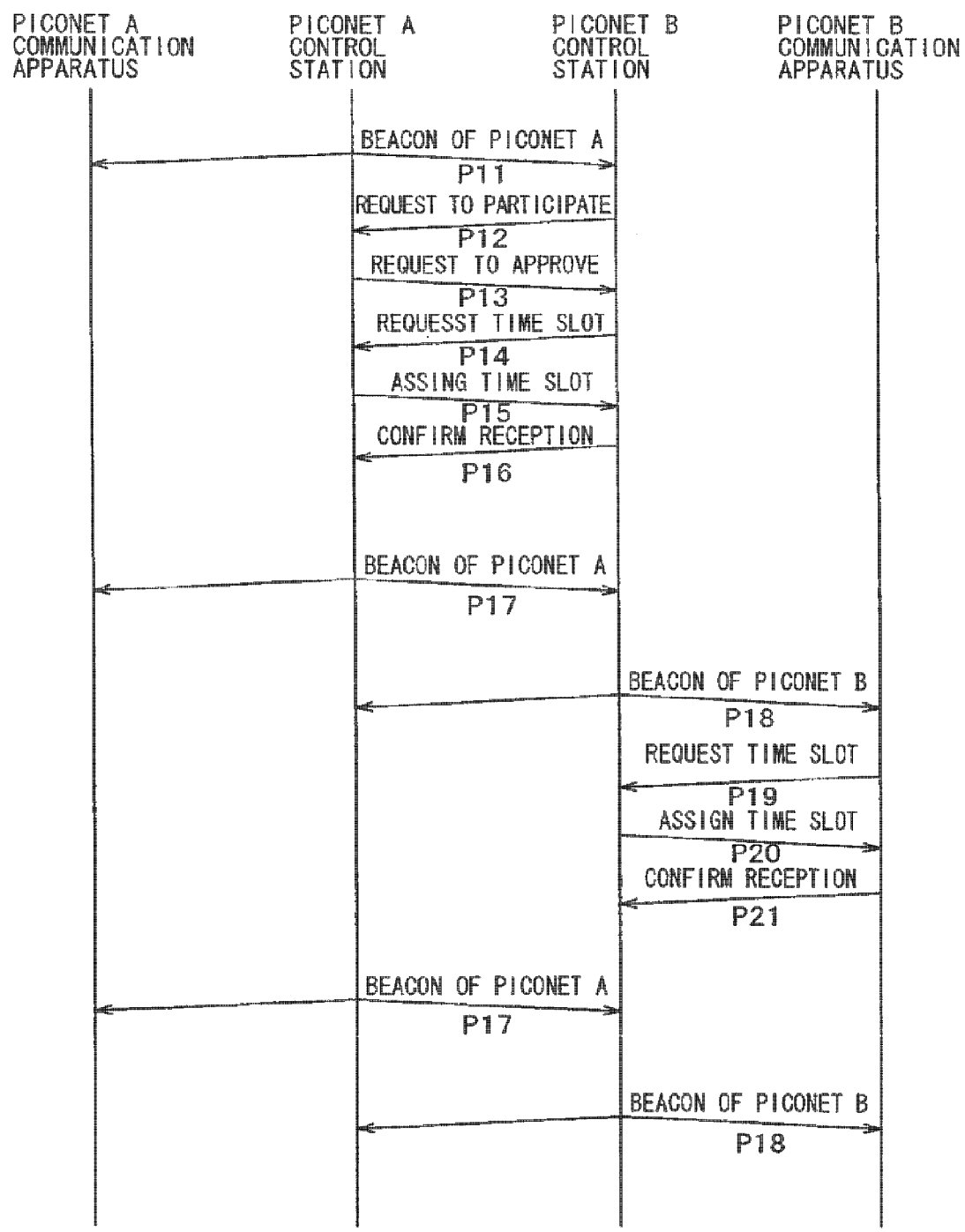
FIG. 15 is a diagram illustrating an operation sequence for realizing the coexistence of the two piconets using a same frequency channel by avoiding the interference by each other while forming a parent and daughter relationship.

Referring to FIG. 15, there is shown an example of an operation sequence for realizing the coexistence of two piconets using a same frequency channel without interfering each other while forming a parent and daughter relationship. In the example shown, it is assumed that there are piconet A and piconet B, both independently operating a network without forming a parent and daughter relationship in advance.

First, it is assumed that the control station of piconet B could receive the beacon of piconet A (P11).

Consequently, the control station of piconet B sends a participation request to the control station of piconet A (P12). In response, the control station of piconet A returns a participation approval to the control station of piconet B (P13). The participation approval is performed by the assignment of a network address and its return for example. As a result, a parent relationship is formed between piconet A and piconet B.

Then, the control station of the piconet B sends a time slot request (or a channel time request) to the control station of piconet A (P14). In response, the control station of piconet A returns a time slot assignment to the control station of piconet B (P15). At this time, the control station of piconet A may send the time slot assignment by a direct frame or by a beacon written with a time slot assignment result.

The time slot assignment is returned in a method in which the control station of piconet A notifies, within piconet A, a beacon written with the time slot assignment in piconet A, for example. Alternatively, the control station of piconet A may directly send a transmission frame written with time slot assignment information to the control station of piconet B (a direct frame). In the latter, the control station of piconet B may confirm the reception of the transmission frame to the control station of piconet A (P16).

The control station of piconet A notifies the beacon within piconet A (P17). The beacon indicates the information that time slot assignment is made for piconet B. Therefore, piconet B may operate piconet B by use of the assigned time slot.

Consequently, if piconet B is newly constructed in a same space in which piconet A exists or piconet B has moved to the same space, the problem of contention inside piconet A can be solved to dynamically assign the time slot (or resources) for operating piconet B.

The control station of piconet B notifies the beacon written with the operation of piconet B within piconet B (P18). Further, the communication apparatus built in piconet B can request the control station of piconet B for a time slot assignment (P19). In response, the control station of piconet B reassigns a portion of the time slot assigned by piconet A before to notify it by the direct frame for example (P20). The communication apparatus of piconet B may return a reception confirmation (P21).

In UWB wireless transmission, if two or more uncoordinated UWB wireless networks exist in a same area, each network performs communication at a low signal power density by use of an overlapping ultra wide band occupied band, so that, depending on the positional relationship between receiving/transmitting apparatuses, a heavy interference occurs. If the operation sequence between piconets shown in FIG. 15 is applied to the UWB wireless communication scheme, no resource overlapping occurs, so that the interference may be effectively avoided, thereby allowing UWB wireless transmission without interference between networks.

Figure 16:
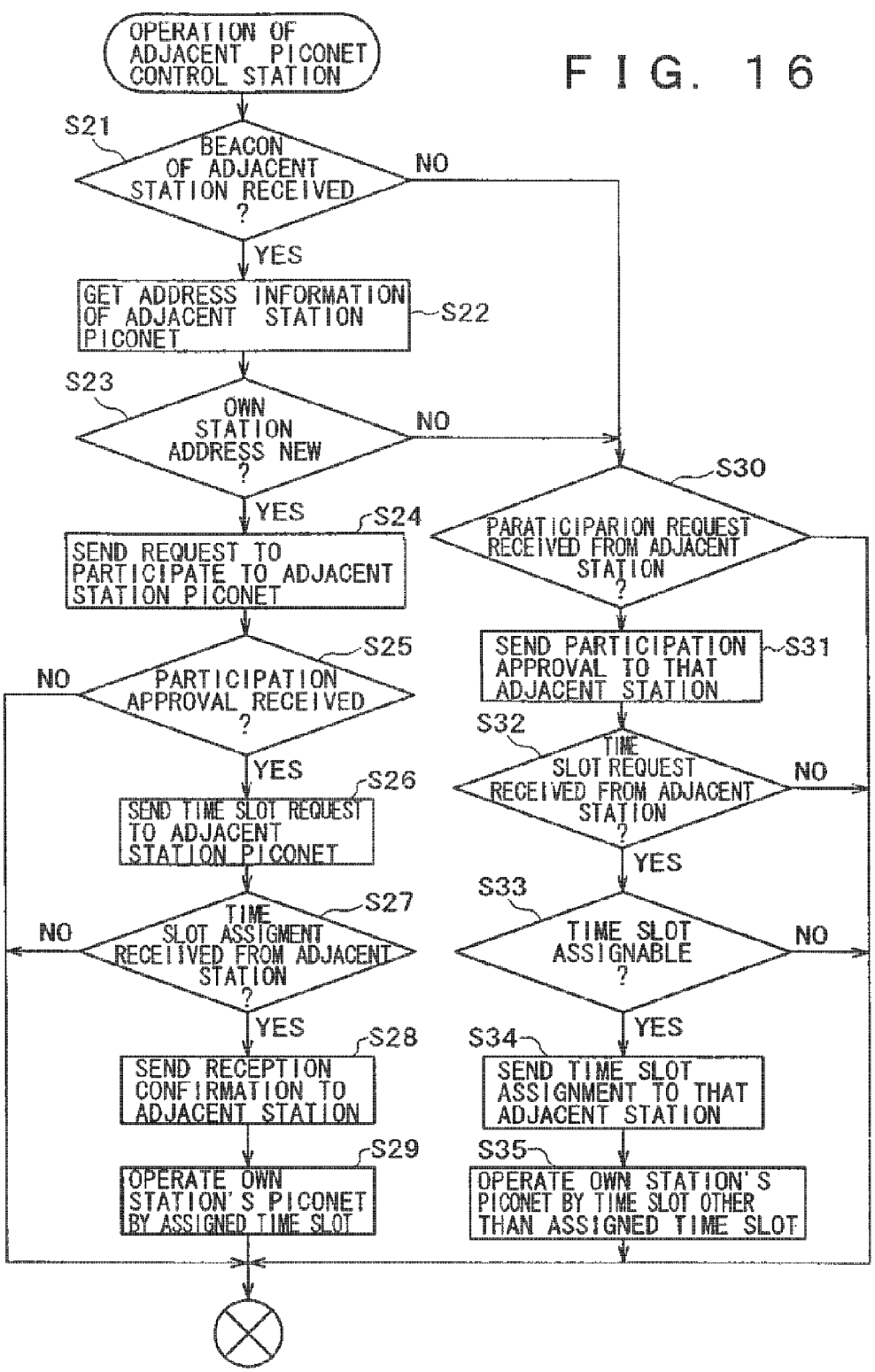
FIG. 16 is a flowchart describing a processing procedure of a control station for realizing the coexistence with another piconet by avoiding the interference by each other while forming a parent and daughter relationship.

Referring to FIG. 16, there is shown a flowchart describing a processing procedure of the control station for realizing the coexistence of piconets by avoiding the interference therebetween while forming a parent and daughter relationship therewith. Actually, this processing operation is realized by the control section 67 of the wireless communication apparatus 10 by executing predetermined program codes.

First, the existence of an adjacent piconet is detected by receiving a beacon signal from an adjacent station for example (step S21).

If the beacon signal has been received from an adjacent station, it is attempted to participate in this existing adjacent piconet as a daughter piconet. In this case, the address information of the adjacent station piconet is obtained from this beacon information (step S22).

Next, the obtained address information is compared with the address information of the own station to determine whether the address of the own station is newer (step S23). If the address of the own station found newer, the participation request is sent to the control station of the adjacent piconet (step S24) and determines whether the participation approval from the adjacent piconet has been received (step S25). Upon reception of the participation approval (step S25), the operation of participating into this adjacent piconet is completed. As a result, the daughter piconet can be constructed with the adjacent piconet being the parent piconet. Subsequently, the transmission time slot necessary for the own station piconet may be estimated.

Next, a time slot request is sent to the control station of the adjacent piconet, which is the parent piconet (step S26). If a time slot assignment comes from that control station (step S27), the reception confirmation is returned to that control station (step S28).

Subsequently, the operation of the piconet of the own station is enabled on the assigned time slot (step S29). Thereafter, when a time slot assignment request from the communication station of the piconet of the own station occurs, the communication may be performed by reassigning this assigned time slot.

Subsequently, the operation of the piconet of the own station is enabled on the assigned time slot (step S29). Thereafter, when a time slot assignment request from the communication station of the piconet of the own station occurs, the communication may be performed by reassigning this assigned time slot.

On the other hand, if no beacon signal has been received from the adjacent station in step S21 or the address of the own station obtained from the adjacent piconet is found not newer in step S23, then the possibility for the own station to operate as the parent piconet is determined. Namely, whether a participation request from the adjacent station has been received or not is determined (step S30).

When a participation request has been received from the adjacent station, the adjacent station is made participate in the own station network and an address is assigned to the adjacent station and a participation approval is sent thereto (step S31). This participation approval includes the address assigned to the adjacent station.

Next, when a time slot request has been received from this adjacent station (step S32), it is determined whether the assignment of the time slot request is practicable (step S33). If the time slot assignment is found practicable, the time slot assignment is sent to that adjacent station (step S34).

Subsequently, the piconet of the own station is operated in an area other than the assigned time slot (step S35).

In the example shown in FIG. 16, a parent and daughter relationship is formed on the basis of the address information of the control station in addition to the sequence in which the piconets are constructed. For this address, the identification information unique to equipment (physical), such as MAC (Machine Control Access) address for example is used. In this case, the new address denotes a new model. Therefore, forming a parent and daughter relationship between piconets in accordance with the address information can set the wireless communication apparatus having the old address to the parent piconet and, at the same time, recursively construct daughter piconets by the wireless communication apparatuses having more up-to-date control station capabilities. The control station of the parent piconet may not necessarily sense the existence of daughter piconets in the same space.

Figure 17:
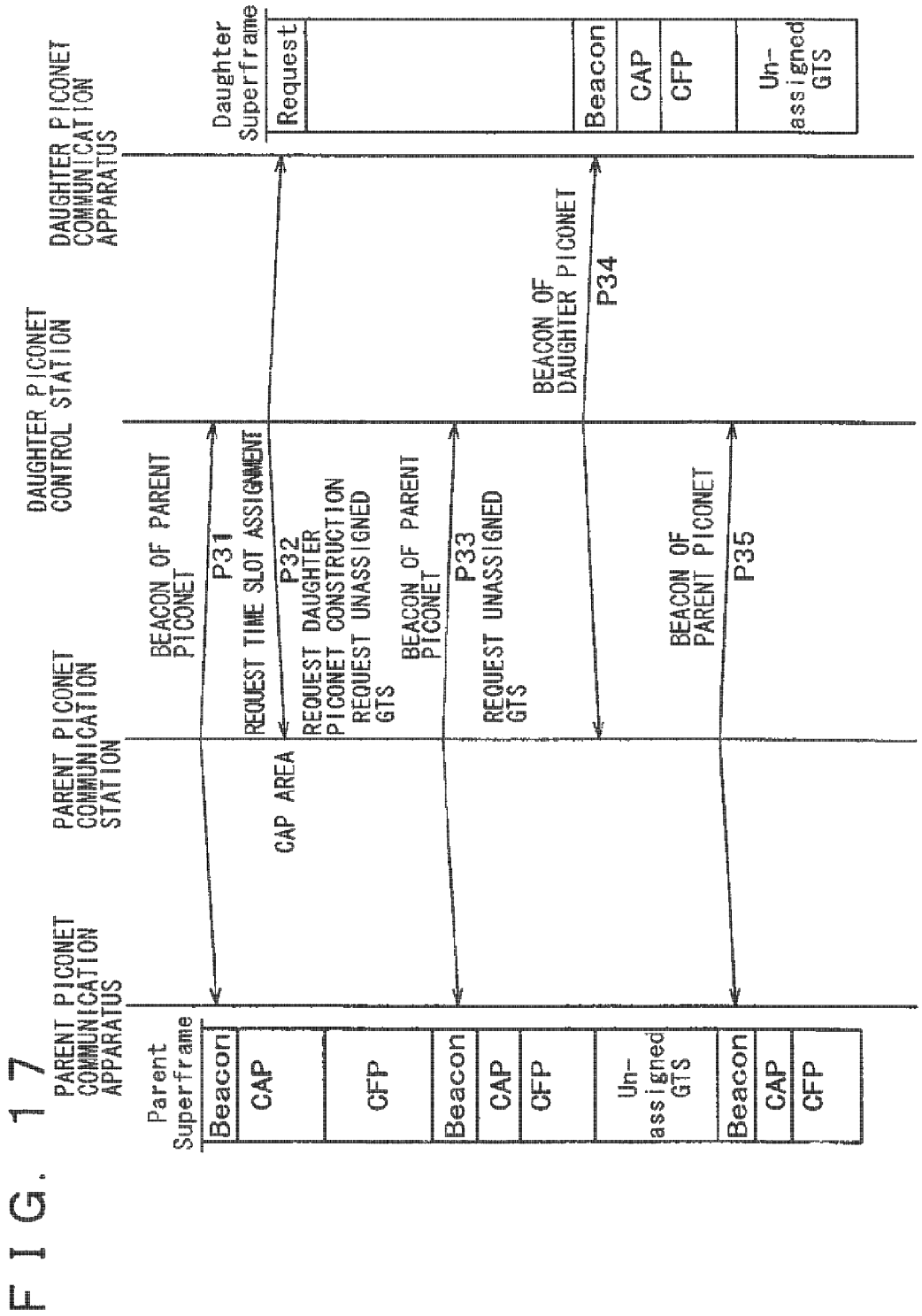
FIG. 17 is a diagram illustrating another example of an operation sequence for realizing the coexistence of two piconets having a same frequency channel by avoiding the interference by each other while forming a parent and daughter relationship.

Referring to FIG. 17, there is shown another example of an operation sequence for realizing the coexistence of two piconets by avoiding the interference therebetween while forming a parent and daughter relationship therewith. It is assumed that, in the parent piconet and the daughter piconet, the network is operated with the transmission frame period having the structure shown in FIG. 7.

From the control station of the parent piconet, a beacon signal of the parent piconet is sent to the daughter piconet in a predetermined period (P31).

On the side of the control station of the daughter piconet, when constructing the daughter piconet, a time slot assignment request (an unassigned GTS) is sent as the daughter piconet's construction request in the contention access period (CAP) of the parent piconet (P32).

If a time slot assignment request has been received from the daughter piconet, the control station of the parent piconet sets the unassigned area for the daughter piconet because a daughter piconet construction request has been received and transmits a next parent piconet beacon signal including the unassigned area information, thereby notifying the unassigned GTS (P33).

Receiving the parent piconet beacon signal including the unassigned area information, the control station of the daughter piconet starts operating the daughter piconet in that unassigned area, transmitting a daughter piconet beacon signal (P34). At this moment, the area that is used for the transmission of the parent piconet is set as an unassigned area on the side of the daughter piconet.

Further, receiving the daughter piconet beacon signal, the control station of the parent piconet may use its own unassigned area to know that the daughter piconet has been formed.

Thus, if the daughter piconet appears in the state with no time slot assigned at all in such a case as when the daughter piconet is newly constructed in a same space of the parent piconet or the daughter piconet has moved from another space into the parent piconet, the problem of the contention between networks can be resolved to suitably perform the dynamic assignment of a time slot (or resources). In addition, the parent network can assign resources to any other network that newly appears in the same space.

Subsequently, the beacon signal of the parent piconet is transmitted by use of the unassigned area of the daughter piconet (P35).

In UWB wireless transmission, if two or more uncoordinated UWB wireless networks exist in a same area, each network performs communication at a low signal power density by use of an overlapping ultra wide band occupied band, so that, depending on the positional relationship between receiving/transmitting apparatuses, a heavy interference occurs. If the operation sequence between piconets shown in FIG. 17 is applied to the UWB wireless communication scheme, no resource overlapping occurs, so that the interference may be effectively avoided, thereby allowing UWB wireless transmission without disturbance between networks.

Figure 18:
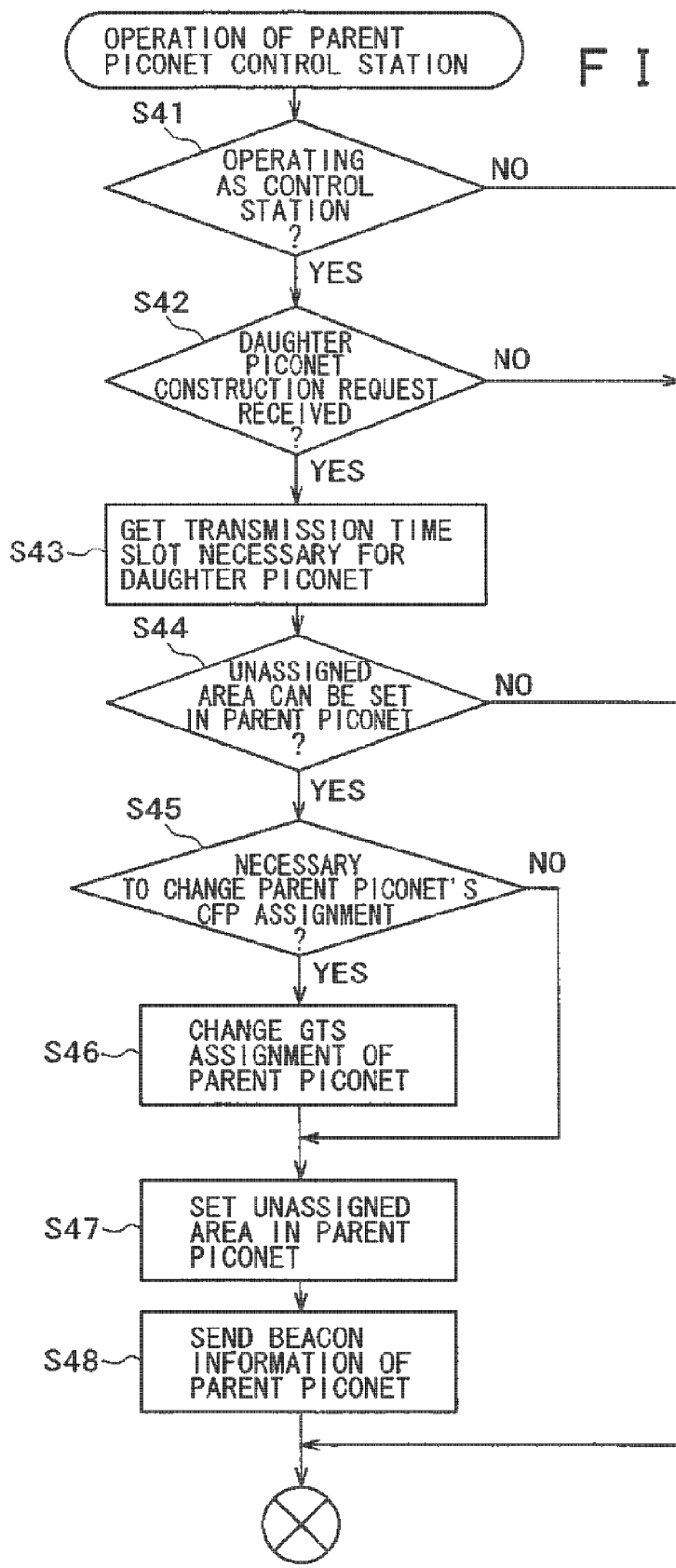
FIG. 18 is a flowchart describing a processing procedure of the control station of the parent piconet for realizing the coexistence of the piconets by avoiding the interference by each other in accordance with the processing procedure between the piconets shown in FIG. 17.

Referring to FIG. 18, there is shown a flowchart describing a processing procedure of the control station of the parent piconet for realizing the coexistence of piconets by avoiding the interference therebetween in accordance with the operation procedure between piconets shown in FIG. 17. Actually, this processing operation is realized by executing predetermined program codes by the control section 67 of the wireless communication apparatus 10, which operates as the control station of the parent piconet.

First, in step S41, it is determined whether the wireless communication apparatus itself is operating as the control station.

If the wireless communication apparatus is found operating not as the control station, then the decision is No in step S41, upon which this processing routine comes to an end. If the wireless communication apparatus is found operating as the control station, it is determined in step S42 whether a daughter piconet construction request has been received.

If the daughter piconet construction request has not been received, the decision of step S42 is No, upon which this processing routine comes to an end. If the daughter piconet construction request has been received, then the information about the transmission time slot (the time) necessary for the piconet is obtained in step S43.

In step S44, it is determined whether it is practicable to set the corresponding transmission time slot as an unassigned area in the parent piconet.

If the unassigned area cannot be set, the decision in step S44 is No, upon which this processing routine comes to an end. If the unassigned area can be set, then it is determined in step S45 whether a change is necessary to the existing time slot assignment.

If the change is necessary, then the time slot assignment in the parent piconet is changed in step S46. If the change is not necessary, the process of step S46 is skipped.

In step S47, the unassigned area is set in the parent piconet. In step S48, this setting is transmitted as the beacon information of the parent piconet, upon which this processing routine comes to an end.

Figure 19:
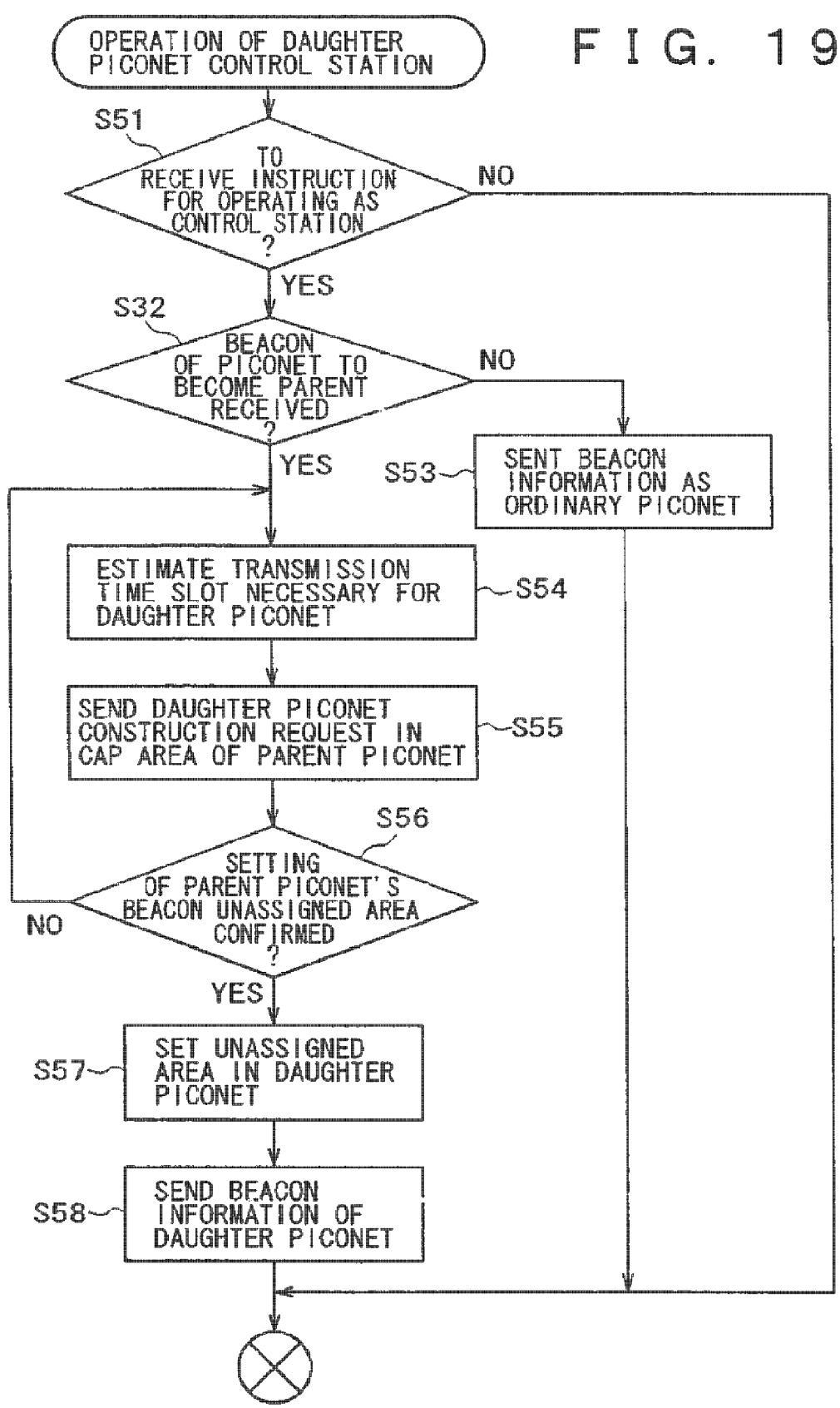
FIG. 19 is a flowchart describing a processing procedure of the control station of the daughter piconet for realizing the coexistence of the piconets by avoiding the interference by each other in accordance with the operation procedure between the piconets shown in FIG. 17.

Referring to FIG. 19, there is shown a flowchart describing a processing procedure of the control station of the daughter piconet for realizing the coexistence of piconets by avoiding the interference therebetween in accordance with the operation procedure executed between the piconets shown in FIG. 17. Actually, this processing operation is realized by the control section 67 of the wireless communication apparatus that operates as the control station of the daughter piconet by executing predetermined program codes.

First, in step S51, on a basis of user instruction for example, it is determined whether the wireless communication apparatus has received an instruction for operating as the control station.

If the wireless communication apparatus has not received the instruction, the decision block S51 is No, upon which this processing routine comes to an end. If the wireless communication apparatus has received the instruction, is determined in step S52 whether a beacon signal of the parent piconet has been received.

If the wireless communication apparatus has not received the beacon signal from the parent piconet, the decision block S52 is No and the wireless communication apparatus operates as the control station of an ordinary piconet in step S53 to transmit a beacon signal, upon which this processing routine comes to an end.

If the wireless communication apparatus has received the beacon signal from the parent piconet, then a transmission time slot (or time) necessary for the daughter piconet is estimated in step S54. In step S55, the daughter piconet construction request is transmitted in the contention access period (CAP) in the parent piconet.

In step S56, the beacon of the parent piconet is received to determine whether the setting of an unassigned area has been performed.

If the setting of an unassigned area has not been performed, the decision block S56 is No and the procedure returns to step S54, in which the transmission time slot necessary for the daughter piconet is estimated again, transmitting a daughter piconet construction request to the parent piconet.

On the other hand, if the setting of the unassigned area in the parent piconet has been confirmed, then the setting of an unassigned area in the daughter piconet is performed in step S57.

In step S58, the setting of the unassigned area is sent as the beacon information of the daughter piconet, upon which this processing routine comes to an end.

Supplement:

While the preferred embodiments of the present invention have been described using specific terms, such description is for illustrative purposes only, and it is to be understood that changes and variations may be made without departing from the spirit or scope of the appended claims.

While the preferred embodiments of the present invention have been described using specific terms, such description is for illustrative purposes only, and it is to be understood that changes and variations may be made without departing from the spirit or scope of the appended claims.

INDUSTRIAL APPLICABILITY

As described, the present invention describes an excellent wireless communication system which allows the coexistence of a plurality of wireless networks contending each other on a same frequency band, excellent wireless communication control apparatus and wireless communication control method which allow the suitable control of the communication operation in each of a plurality of wireless networks contending each other on a same frequency band, and an excellent computer program supporting these capabilities.

As described, the present invention provides an excellent wireless communication system, excellent wireless communication control apparatus and wireless communication control method, and an excellent computer program which allow the coexistence of a plurality of personal area networks on a same frequency channel by time-division-multiplexing a transmission frame period only by performing control between transmission apparatuses providing control stations.

As described, the present invention provides an excellent wireless communication system, an excellent wireless communication control apparatus and wireless communication control method, and an excellent program which, when a new network has been constructed in a same space or a network has moved thereto from another space for example, allow to solve the problem of the contention between networks, thereby suitably performing the dynamic assignment of time slots (or resources).

As described and according to the invention, beacon signals are transferred between the control stations existing on a same channel, which allows to understand the frame structure of the destination network, thereby changing the time slot assignment so as to avoid the collision with the guaranteed time slot of the own network from the status of the guaranteed time slot.

As described and according to the invention, on the basis of the guaranteed time slot status, an area to be used for the transmission by the destination network may be set as an unassigned area of the own network, thereby realizing the transmission which avoids the collision with the information of the destination network.

As described and according to the invention, if an unassigned area is set on the destination network, this unassigned area may be set as an area for use by the own network for transmission, thereby making a plurality of networks coexist on a same channel.

If the control station of the own network does not receive a beacon signal from the destination network, the above-mentioned setting of the unassigned area may be cleared, thereby realizing a method of effectively using a same channel by the own network.

Alternatively, one control station may issue a network construction request to the other control station, thereby performing time slot assignment between the networks. The construction request to the other control station includes a participation request for participating in the network and a time slot request for requesting the other control station for time slot assignment.

As described above and according to the invention, the communication terminals under the control of the wireless base station in the parent network recursively have the wireless base station capabilities and, within a resource scope of the own apparatus assigned to the wireless base station, assign resources to an other communication terminals under the control of the wireless base station, thereby allowing to configure two or more networks which are guaranteed not to disturb each other.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

In the drawings:
FIG. 1
PARENT NETWORK
DAUGHTER NETWORK
FIG. 2
112 RADIO RECEIVING SECTION
113 DEMODULATING SECTION
→RECEIVING DATA
114 REQUEST CONFIRMING SECTION
115 SCHEDULER
115 BEACON INSERTING SECTION
←TRANSMITTING DATA
117 MODULATING SECTION
118 RADIO TRANSMITTING SECTION
FIG. 3
122 RADIO RECEIVING SECTION
123 DEMODULATING SECTION
→RECEIVING DATA
124 BEACON CAPTURING SECTION
125 REQUEST CONFIRMING SECTION
15 SCHEDULER
127 COMMUNICATION CONTROL SECTION
128 BEACON INSERTING SECTION ←TRANSMITTING DATA FOR DAUGHTER NETWORK
129 FRAME CONFIGURING SECTION
←TRANSMITTING DATA FOR PARENT NETWORK
↓TRANSMISSION REQUEST SIGNAL
130 MODULATING SECTION
131 RADIO TRANSMITTING SECTION
FIG. 4
From above, from left
TDMA FRAME
PARENT NETWORK BEACON USER A USER B USER C
CONTENTION PARTITION
DAUGHTER NETWORK BEACON USER D USER E
 CONTENTION PARTITION
FIG. 5
From left
FIRST PICONET 1
SECOND PICONET 2
FIG. 6
From above, from left
FIRST PICONET 1
SECOND PICONET 2
COMMUNICATION BETWEEN PICONETS
FIG. 7
34 GUARANTEED TIME SLOT
31 BEACON
32 CONTENTION ACCESS PERIOD
33 CONTENTION FREE PERIOD
→TIME
30 TRANSMISSION FRAME PERIOD
FIG. 8
61 INTERFACE
62 INTERFACE BUFFER
63 WIRELESS BUFFER
64 WIRELESS COMMUNICATION SECTION
67 CONTROL SECTION
68 INFORMATION STORAGE SECTION
65 ANTENNA
10 WIRELESS COMMUNICATION APPARATUS
FIG. 9
From above, from left
CONTROL STATION 11 OF FIRST PICONET 1
CONTROL STATION 21 OF SECOND PICONET 2
BEACON INFORMATION OF FIRST PICONET (P1)
(RECEPTION DISABLED)
BEACON INFORMATION OF SECOND PICONET (P2)
SET UNASSIGNED AREA FOR SECOND PICONET
BEACON INFORMATION OF FIRST PICONET (P3)
SET UNASSIGNED AREA FOR FIRST PICONET
BEACON INFORMATION OF SECOND PICONET (P4)
CLEAR UNASSIGNED ARE FOR SECOND PICONET
BEACON INFORMATION OF SECOND PICONET (P5)
(RECEPTION DISABLED)
BEACON INFORMATION OF FIRST PICONET (P6)
(RECEPTION DISABLED)
CLEAR UNASSIGNED AREA FOR FIRST PICONET
FIG. 10
From above, from left
FRAME PERIOD N OF FIRST PICONET
FIRST PICONET
CONTENTION FREE PERIOD (CFP)
SECOND PICONET
CONTENTION FREE PERIOD (CFP)
FRAME PERIOD OF SECOND PICONET
FRAME PERIOD OF SECOND PICONET
FIG. 11
From above, from left
FRAME PERIOD N OF FIRST PICONET
FIRST PICONET
CONTENTION FREE PERIOD (CFP)
UNASSIGNED AREA
SECOND PICONET
CONTENTION FREE PERIOD (CFP)
FRAME PERIOD OF SECOND PICONET
FRAME PERIOD OF SECOND PICONET
FIG. 12
From above, from left
FRAME PERIOD N OF FIRST PICONET
FIRST PICONET
CONTENTION FREE PERIOD (CFP)
UNASSIGNED AREA
SECOND PICONET
CONTENTION FREE PERIOD (CFP)
CONTENTION FREE PERIOD (CFP)
UNASSIGNED AREA
FRAME PERIOD OF SECOND PICONET
FRAME PERIOD OF SECOND PICONET
FIG. 13
From above, from left
FRAME PERIOD N OF FIRST PICONET
FIRST PICONET
CONTENTION FREE PERIOD (CFP)
SECOND PICONET
CONTENTION FREE PERIOD (CFP)
CONTENTION ACCESS PERIOD (CAP)
FRAME PERIOD OF SECOND PICONET
FRAME PERIOD OF SECOND PICONET
FIG. 14
CONTROL STATION PROCESSING
S1 OPERATING AS CONTROL STATION?
S2 BEACON OF ANOTHER PICONET RECEIVED?
S3 CHECK FRAME STRUCTURE FROM OTHER PICO-
 NET INFORMATION.
S4 UNASSIGNED AREA SET TO OWN PICONET?
S5 DUPLICATE ASSIGNMENT WITH ANOTHER PICO-
 NET?
S6 CHANGE GTS ASSIGNMENT OF OWN PICONET.
S7 ASSIGNED TO BEACON TRANSMITTING TIME?
S8 ADJUST BEACON TRANSMITTING TIME.
S9 USE THAT UNASSIGNED AREA BY OWN PICONET.
S10 SET UNASSIGNED AREA OF OWN PICONET.
S11 SEND BEACON INFORMATION ADDRESSED TO
 OWN PICONET.
FIG. 15
From above, from left
PICONET A COMMUNICATION APPARATUS
PICONET A CONTROL STATION
PICONET B CONTROL STATION
PICONET B COMMUNICATION APPARATUS
 BEACON OF PICONET A P11
 REQUEST TO PARTICIPATE P12
 REQUEST TO APPROVE P13
 REQUEST TIME SLOT P14
 ASSIGN TIME SLOT P15
 CONFIRM RECEPTION P16
 BEACON OF PICONET A P17
 BEACON OF PICONET B P18
 REQUEST TIME SLOT P19
 ASSIGN TIME SLOT P20
 CONFIRM RECEPTION P21
 BEACON OF PICONET A P17
 BEACON OF PICONET B P18
FIG. 16
OPERATION OF ADJACENT PICONET CONTROL STA-
 TION S21 BEACON OF ADJACENT STATION RECEIVED?
S22 GET ADDRESS INFORMATION OF ADJACENT STATION PICONET.
S23 OWN STATION ADDRESS NEW?
S24 SEND REQUEST TO PARTICIPATE TO ADJACENT STATION.
S25 PARTICIPATION APPROVAL RECEIVED?
S26 SEND TIME SLOT REQUEST TO ADJACENT STATION PICONET.
S27 TIME SLOT ASSIGNMENT RECEIVED FROM ADJACENT STATION?
S28 SEND RECEPTION CONFIRMATION TO ADJACENT STATION.
S29 OPERATE OWN STATION'S PICONET BY ASSIGNED TIME SLOT.
S30 PARTICIPATION REQUEST RECEIVED FROM ADJACENT STATION?
S31 SEND PARTICIPATION APPROVAL TO THAT ADJACENT STATION.
S32 TIME SLOT REQUEST RECEIVED FROM ADJACENT STATION?
S33 TIME SLOT ASSIGNABLE?
S34 SEND TIME SLOT ASSIGNMENT TO THAT ADJACENT STATION.
S35 OPERATE OWN STATION'S PICONET BY TIME SLOT OTHER THAN ASSIGNED TIME SLOT.
FIG. 17
From above, from left
PARENT PICONET COMMUNICATION APPARATUS
PARENT PICONET CONTROL STATION
DAUGHTER PICONET CONTROL STATION
DAUGHTER PICONET COMMUNICATION APPARATUS
BEACON OF PARENT PICONET P31
CAP AREA
REQUEST TIME SLOT ASSIGNMENT P32
REQUEST DAUGHTER PICONET CONSTRUCTION
REQUEST UNASSIGNED GTS
BEACON OF PARENT PICONET P33
REQUEST UNASSIGNED GTS
 BEACON OF DAUGHTER PICONET P34
BEACON OF PARENT PICONET P35
FIG. 18
OPERATION OF PARENT PICONET CONTROL STATION
S41 OPERATING AS CONTROL STATION?
S42 DAUGHTER PICONET CONSTRUCTION REQUEST RECEIVED?
S43 GET TRANSMISSION TIME SLOT NECESSARY FOR DAUGHTER PICONET.
S44 UNASSIGNED AREA CAN BE SET IN PARENT PICONET?
S45 NECESSARY TO CHANGE PARENT PICONET'S CFP ASSIGNMENT?
S46 CHANGE GTS ASSIGNMENT OF PARENT PICONET.
S47 SET UNASSIGNED AREA IN PARENT PICONET.
S48 SEND BEACON INFORMATION OF PARENT PICONET.
FIG. 19
OPERATION OF DAUGHTER PICONET CONTROL STATION
S51 TO RECEIVE INSTRUCTION FOR OPERATING AS CONTROL STATION?
S32 BEACON OF PICONET TO BECOME PARENT RECEIVED?
S53 SEND BEACON INFORMATION AS ORDINARY PICONET.
S54 ESTIMATE TRANSMISSION TIME SLOT NECESSARY FOR DAUGHTER PICONET.
S55 SEND DAUGHTER PICONET CONSTRUCTION REQUEST IN CAP AREA OF PARENT PICONET.
S56 SETTING OF PARENT PICONET'S BEACON UNASSIGNED AREA CONFIRMED?
S57 SET UNASSIGNED AREA IN DAUGHTER PICONET.
S58 SEND BEACON INFORMATION OF DAUGHTER PICONET.
FIG. 20
901 INFORMATION BIT
902 SPREAD CODE
903 SS SIGNAL
904 TRANSMIT SIGNAL
905 RECEIVE SIGNAL
906 DEPREAD CODE
907 MULTIPLEX SIGNAL
908 INTEGRAL SIGNAL
RECEIVED BIT (TO A/D)

The invention claimed is:

1. A wireless communication system, comprising:
a plurality of wireless communication apparatuses; and
a plurality of wireless networks that coexist in a same frequency band, each one of the wireless networks including an associated portion of the plurality of wireless communication apparatuses with one of the wireless communication apparatuses associated with that wireless network operating as a control station for that wireless network, the control station of each such wireless network initially performing time slot assignment within every predetermined transmission frame period to each one of said wireless communication apparatuses of that wireless network independent of the control stations of the other such networks, the control stations of each of said wireless networks comprising:
signal detecting means for detecting a signal from another of said plurality of wireless networks, for detecting address information of the control station of the another wireless network from the detected signal, and for comparing the address information of that control station with the address information of the control station of the another wireless network;
time slot analyzing means for, in response to the address information of that control station being newer than the address information of the control station of the another wireless network, analyzing a transmission time slot on which guaranteed time slot transmission is performed in the another of said wireless networks based on a signal detected by said signal detecting means; and
time slot assigning means that, in response to the address information of that control station being newer than the address information of the control station of the another wireless network, avoids assigning a transmission time slot on which guaranteed time slot transmission is performed in the another of said wireless networks to a wireless communication apparatus in that wireless network.

2. The wireless communication system according to claim 1, wherein said time slot assigning means sets the transmission time slot on which guaranteed time slot transmission is performed in the another of said wireless networks as an unassigned area in the own wireless network.

3. The wireless communication system according to claim 2, wherein said time slot assigning means clears the setting of the unassigned area in the own wireless network in response to that said signal detecting means does not detect the signal from the another of said wireless networks.

4. The wireless communication system according to claim 1, wherein said time slot analyzing means analyzes an unassigned area in the another of said wireless networks and said time slot assigning means performs time slot assignment within the own wireless network by use of said unassigned area in said another wireless network.

5. A wireless communication control apparatus in a network environment in which a plurality of wireless networks coexist in a same frequency band, said wireless communication control apparatus being a control station of one of said plurality of wireless networks, said wireless communication control apparatus comprising:
   signal detecting means for detecting a signal from another of said wireless networks, for detecting address information of the control station of the another wireless network from the detected signal, and for comparing the address information of said wireless communication control apparatus with the address information of the control station of the another wireless network, each one of the wireless networks including an associated portion of the plurality of wireless communication apparatuses with one of the wireless communication apparatuses associated with that wireless network operating as a control station for that wireless network, said wireless communication control apparatus and the control station of the another wireless network each initially performing time slot assignment within every predetermined transmission frame period to each one of said wireless communication apparatuses of that wireless network independent of the control stations of the other wireless network;
   time slot analyzing means for, in response to the address information of said wireless communication control apparatus being newer than the address information of the control station of the another wireless network, analyzing a transmission time slot on which guaranteed time slot transmission is performed in the another of said wireless networks based on the signal detected by said signal detecting means; and
   time slot assigning means which, in response to the address information of said wireless communication control apparatus being newer than the address information of the control station of the another wireless network, avoids assigning a transmission time slot on which guaranteed time slot transmission is performed on the another of said wireless networks to a wireless communication apparatus in that wireless network.

6. The wireless communication control apparatus according to claim 5, wherein said time slot assigning means sets the transmission time slot on which guaranteed time slot transmission is performed on the another of said wireless networks as an unassigned area within that wireless network.

7. The wireless communication control apparatus according to claim 6, wherein said time slot assigning means clears the setting of the unassigned area in that wireless network in response to that said signal detecting means does not detect the signal from the another of said wireless networks.

8. The wireless communication control apparatus according to claim 5, said time slot analyzing means analyzes an unassigned area in the another of said wireless networks, and said time slot assigning means performs time slot assignment within that wireless network using said unassigned area in said another wireless network.

9. A wireless communication control method, comprising:
   providing a plurality of wireless communication apparatuses;
   providing a plurality of wireless networks that coexist in a same frequency band, each one of the wireless networks including an associated portion of the plurality of wireless communication apparatuses with one of the wireless communication apparatuses associated with that wireless network operating as a control station for that wireless network, the control station of each such wireless network initially performing time slot assignment within every predetermined transmission frame period to each one of said wireless communication apparatuses of that wireless network independent of the control stations of the other such networks; and
   for at least one of said wireless networks,
      detecting a signal from another of said wireless networks,
      detecting address information of the control station of the another wireless network from the detected signal,
      comparing the address information of that control station with the address information of the control station of the another wireless network, and
      in response to the address information of that control station being newer than the address information of the control station of the another wireless network,
         analyzing a transmission time slot on which guaranteed time slot transmission is performed in the another of said wireless networks based on the signal detected in said signal detecting step, and
         avoiding assigning a transmission time slot on which guaranteed time slot transmission is performed on the another of said wireless networks to a wireless communication apparatus in that wireless network.

10. The wireless communication control method according to claim 9, wherein said time slot assigning step includes setting the transmission time slot on which guaranteed time slot transmission is performed on the another of said wireless networks as an unassigned area within that wireless network.

11. The wireless communication control method according to claim 10, wherein said time slot assigning step includes clearing the setting of the unassigned area in that wireless network in response to that said signal detecting step does not detect the signal from the another of said wireless networks.

12. The wireless communication control method according to claim 9, wherein said time slot analyzing step includes analyzing an unassigned area in the another of said wireless networks and said time slot assigning step performs time slot assignment within that wireless network using said unassigned area in said another wireless network.

13. A wireless communication system, comprising:
   a plurality of wireless communication apparatuses; and
   a plurality of wireless networks that coexist in a same frequency band, each one of the wireless networks including:
      an associated portion of the plurality of wireless communication apparatuses with one of the wireless communication apparatuses associated with that wireless network operating as a control station for that wireless network, the control station of each such wireless network performing time slot assignment within every predetermined transmission frame period to each one of said wireless communication apparatuses of that wireless network, the control station of one such wireless network being a base station, the control station of another such wireless network operating under the control of the control station of the one such wireless network and being a newer model than the control station of the one such wireless network, at least one of said one such and said another such wireless networks providing, in response to the control station of that wireless network receiving a request for constructing a new wireless network, a transmission time slot for said new wireless network.

14. The wireless communication system according to claim 13, wherein the at least one of said one such and said another such wireless networks comprises:

setting means for setting a time slot unassigned area to that wireless network;

transmitting means for transmitting time slot assignment information of that wireless network;

analyzing means for receiving and analyzing time slot assignment information of another wireless network; and a assigning means for assigning a time slot of that wireless network using an unassigned area of a time slot in the another wireless network.

15. The wireless communication system according to claim 13, wherein said construction request is a request for participation of another control station which constructs the new wireless network.

16. The wireless communication system according to claim 13, wherein said construction request is a request from another control station, which constructs the new wireless network, for a time slot to a control station of yet another wireless network.

17. The wireless communication system according to claim 13, wherein information that a transmission time slot has been set to said new wireless network is included in time slot assignment information and notified in the new wireless network.

18. The wireless communication system according to claim 13, wherein a transmission frame for notifying said new wireless network of the setting of a transmission time slot is transmitted to a control station of said new wireless network.

19. A non-transitory computer-readable medium having recorded thereon a program for executing, on a computer system, a wireless communication control method in a network environment in which a plurality of wireless networks coexist in a same frequency band, said method comprising:

detecting a signal from another of said wireless networks, each one of the wireless networks including an associated portion of the plurality of wireless communication apparatuses with one of the wireless communication apparatuses associated with that wireless network operating as a control station for that wireless network, the control station of each such wireless network initially performing time slot assignment within every predetermined transmission frame period to each one of said wireless communication apparatuses of that wireless network independent of the control stations of the other such networks;

detecting address information of the control station of the another wireless network from the detected signal;

comparing the address information of that control station with the address information of the control station of the another wireless network, and in response to the address information of that control station being newer than the address information of the control station of the another wireless network, analyzing a transmission time slot on which guaranteed time slot transmission is performed in the another of said wireless networks based on the signal detected in said signal detecting step, and avoiding assigning a transmission time slot on which guaranteed time slot transmission is performed on the another of said wireless networks to a wireless communication apparatus in that wireless network.

20. A non-transitory computer-readable medium having recorded thereon a program for executing, on a computer system, a wireless communication control method in a network environment in which a plurality of wireless networks coexist in a same frequency band, said method comprising:

receiving, at a control station of one such wireless network, a request for constructing a new wireless network, each one of the wireless networks including an associated portion of the plurality of wireless communication apparatuses with one of the wireless communication apparatuses associated with that wireless network operating as a control station for that wireless network, the control station of each such wireless network performing time slot assignment within every predetermined transmission frame period to each one of said wireless communication apparatuses of that wireless network, the control station of the one such wireless network being a base station, the control station of the new wireless network operating under the control of the control station of the one such wireless network and being a newer model than the control station of the one such wireless network;

at least one of said one such and said another such wireless networks, performing time slot assignment with a time slot unassigned area set in that wireless network in response to said construction request, and transmitting time slot assignment information in that wireless network.

* * * * *